(12) United States Patent
Raynel et al.

(10) Patent No.: US 11,548,784 B1
(45) Date of Patent: Jan. 10, 2023

(54) TREATING SULFUR DIOXIDE CONTAINING STREAM BY ACID AQUEOUS ABSORPTION

(71) Applicant: Saudi Arabian Oil Company, Dhahran (SA)

(72) Inventors: Guillaume Robert Jean-Francois Raynel, Dhahran (SA); Sebastien A. Duval, Dhahran (SA); Ghulam Shabbir, Dhahran (SA); Olatunde O. Onasanya, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/510,600

(22) Filed: Oct. 26, 2021

(51) Int. Cl.
| | | |
|---|---|---|
| *B01D 5/00* | (2006.01) | |
| *B01D 53/75* | (2006.01) | |
| *B01D 53/86* | (2006.01) | |
| *C01B 17/04* | (2006.01) | |
| *C01B 17/775* | (2006.01) | |

(52) U.S. Cl.
CPC ........ *C01B 17/0456* (2013.01); *B01D 5/0054* (2013.01); *B01D 5/0084* (2013.01); *B01D 53/75* (2013.01); *B01D 53/8603* (2013.01); *C01B 17/775* (2013.01)

(58) Field of Classification Search
CPC .. B01D 5/0054; B01D 53/75; B01D 53/8603; B01D 5/0084; C01B 17/0456; C01B 17/775
See application file for complete search history.

(56) References Cited

U.S. PATENT DOCUMENTS

| | | | |
|---|---|---|---|
| 2,499,370 | A | 3/1940 | De Groote et al. |
| 2,221,518 | A | 11/1940 | Jennings |
| 2,383,674 | A | 8/1945 | Osborne |
| 2,557,081 | A | 6/1951 | De Groote et al. |
| 2,602,053 | A | 7/1952 | De Groote et al. |
| 2,711,388 | A | 6/1955 | Mottern et al. |
| 2,758,477 | A | 8/1956 | Albert |
| 2,825,026 | A | 2/1958 | Holaday et al. |
| 3,133,437 | A | 5/1964 | Remke |

(Continued)

FOREIGN PATENT DOCUMENTS

| | | |
|---|---|---|
| AU | 2004204512 | 7/2004 |
| AU | 2016214075 | 2/2020 |

(Continued)

OTHER PUBLICATIONS

U.S. Appl. No. 16/704,973, filed Dec. 15, 2019, Villete et al.

(Continued)

*Primary Examiner* — Timothy C Vanoy
(74) *Attorney, Agent, or Firm* — Fish & Richardson P.C.

(57) ABSTRACT

Provided herein are methods and systems for treating a tail gas of a Claus process to remove sulfur-containing compounds. The method includes combusting a tail gas of a Claus process in an excess of oxygen gas to yield a thermal oxidizer effluent. The thermal oxidizer effluent includes sulfur dioxide, water vapor, and oxygen. The effluent is routed to a quench tower and contacted with a dilute aqueous acid quench stream to yield sulfurous acid, hydrated sulfur dioxide, or both. The sulfurous acid or hydrated sulfur dioxide is oxidized with the excess oxygen from the thermal oxidizer effluent to yield sulfuric acid.

20 Claims, 4 Drawing Sheets

(56) References Cited

U.S. PATENT DOCUMENTS

| | | |
|---|---|---|
| 3,222,918 A | 12/1965 | Kuntz |
| 3,462,596 A | 8/1969 | Saunders |
| 3,528,775 A | 9/1970 | Siegfriedt |
| 3,539,917 A | 11/1970 | Chleck |
| 3,546,926 A | 12/1970 | Dunavent, Jr. et al. |
| 3,553,576 A | 1/1971 | Petitjean |
| 3,684,735 A | 8/1972 | De Groote et al. |
| 3,727,049 A | 4/1973 | Saunders |
| 3,752,877 A | 8/1973 | Beavon |
| 3,778,706 A | 12/1973 | Thompson |
| 3,806,435 A | 4/1974 | Ohta |
| 3,982,564 A | 9/1976 | Clabbum et al. |
| 4,001,386 A | 1/1977 | Klein et al. |
| 4,034,219 A | 7/1977 | Louden et al. |
| 4,084,306 A | 4/1978 | Barker |
| 4,157,247 A | 6/1979 | Collins, III et al. |
| 4,178,358 A | 12/1979 | Smith et al. |
| 4,180,457 A | 12/1979 | Popp et al. |
| 4,253,928 A | 3/1981 | Blutas et al. |
| 4,301,400 A | 11/1981 | Paap |
| 4,428,839 A | 1/1984 | Davies et al. |
| 4,430,317 A * | 2/1984 | Reed ............... C01B 17/0456 422/177 |
| 4,466,946 A | 8/1984 | Goddin, Jr. et al. |
| 4,481,130 A | 11/1984 | Robertson |
| 4,526,662 A | 7/1985 | Bylery et al. |
| 4,537,701 A | 8/1985 | Oppenlaender et al. |
| 4,543,191 A | 9/1985 | Stewart et al. |
| 4,581,134 A | 4/1986 | Richter, Jr. et al. |
| 4,589,896 A | 5/1986 | Chen et al. |
| 4,592,849 A | 6/1986 | McMillen |
| 4,627,458 A | 12/1986 | Prasad |
| 4,701,187 A | 10/1987 | Choe |
| 4,717,407 A | 1/1988 | Choe et al. |
| 4,737,265 A | 4/1988 | Merchant, Jr. et al. |
| 4,742,304 A | 5/1988 | Schnall et al. |
| 4,765,407 A * | 8/1988 | Yuvancic ............... E21B 43/40 166/305.1 |
| 4,797,550 A | 1/1989 | Nelson et al. |
| 4,818,410 A | 4/1989 | Bellos et al. |
| 4,959,160 A | 9/1990 | Lake |
| 4,961,858 A | 10/1990 | Spei et al. |
| 4,995,952 A | 2/1991 | Dandapani et al. |
| 5,023,069 A | 6/1991 | Serrand |
| 5,035,065 A | 7/1991 | Parkinson |
| 5,067,345 A | 11/1991 | Mougne |
| 5,089,781 A | 2/1992 | Arichika et al. |
| 5,187,101 A | 2/1993 | Kato |
| 5,246,597 A | 9/1993 | Jenson et al. |
| 5,256,305 A | 10/1993 | Hart |
| 5,259,239 A | 11/1993 | Gaisford |
| 5,294,553 A | 3/1994 | Kawahara |
| 5,353,237 A | 10/1994 | Bass et al. |
| 5,381,002 A | 1/1995 | Morrow et al. |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,431,877 A | 7/1995 | Brucken et al. |
| 5,454,258 A | 10/1995 | Capuano |
| 5,531,865 A | 7/1996 | Cole |
| 5,632,803 A | 5/1997 | Stoner |
| 5,693,257 A | 12/1997 | Hart |
| 5,837,032 A | 11/1998 | Moll et al. |
| 5,885,424 A | 3/1999 | Davis et al. |
| 6,039,880 A | 3/2000 | Morataya |
| 6,096,239 A | 8/2000 | Fung et al. |
| 6,153,656 A | 11/2000 | Bourg |
| 6,168,702 B1 | 1/2001 | Varadaraj et al. |
| 6,179,900 B1 | 1/2001 | Behling et al. |
| 6,241,871 B1 | 6/2001 | Donini et al. |
| 6,361,582 B1 | 3/2002 | Pinnau et al. |
| 6,364,940 B1 | 4/2002 | Prueter et al. |
| 6,402,813 B2 | 6/2002 | Monereau et al. |
| 6,451,252 B1 | 9/2002 | Ruan et al. |
| 6,555,009 B2 | 4/2003 | Varadaraj |
| 6,614,242 B2 | 9/2003 | Matter et al. |
| 6,656,249 B1 | 12/2003 | Buisnnan |
| 6,896,717 B2 | 5/2005 | Pinnau et al. |
| 7,036,531 B2 | 5/2006 | Manini et al. |
| 7,306,735 B2 | 12/2007 | Baggott et al. |
| 7,469,188 B2 | 12/2008 | Wee |
| 7,901,646 B2 | 3/2011 | Ayala et al. |
| 7,976,710 B2 | 7/2011 | Minhas et al. |
| 8,043,418 B2 | 10/2011 | Ruud et al. |
| 8,101,086 B2 | 1/2012 | Varadaraj et al. |
| 8,115,481 B2 | 2/2012 | Chen |
| 8,197,673 B2 | 6/2012 | Khan |
| 8,323,392 B2 | 12/2012 | Jones |
| 8,361,200 B2 | 1/2013 | Sayaryi et al. |
| 8,397,765 B2 | 3/2013 | Jackson et al. |
| 8,524,184 B2 | 9/2013 | Iyengar et al. |
| 8,551,199 B2 | 10/2013 | Thacker et al. |
| 8,685,236 B2 | 4/2014 | Miller |
| 8,716,689 B2 | 5/2014 | Chen et al. |
| 8,722,003 B1 | 5/2014 | Avagliano et al. |
| 8,790,509 B2 | 7/2014 | Vu |
| 8,805,587 B1 | 8/2014 | Elshafei et al. |
| 8,828,121 B1 | 9/2014 | He et al. |
| 9,092,124 B2 | 7/2015 | Amminudin et al. |
| 9,096,805 B2 | 8/2015 | Williams |
| 9,149,761 B2 | 10/2015 | Northrop et al. |
| 9,157,035 B1 | 10/2015 | Ball, IV et al. |
| 9,181,499 B2 | 11/2015 | Mason et al. |
| 9,244,017 B2 | 1/2016 | Cadieux et al. |
| 9,295,957 B2 | 5/2016 | Choi et al. |
| 9,399,866 B2 | 7/2016 | Alawadhi |
| 9,435,571 B2 | 9/2016 | Ghoshal et al. |
| 9,448,221 B2 | 9/2016 | Duval et al. |
| 9,493,712 B2 | 11/2016 | Barroeta et al. |
| 9,555,345 B2 | 1/2017 | Al-shafei et al. |
| 9,708,196 B2 | 7/2017 | Brenize et al. |
| 9,731,974 B2 | 8/2017 | Weiss et al. |
| 9,861,910 B2 | 1/2018 | Hammad et al. |
| 9,863,571 B2 | 1/2018 | Critsinelis et al. |
| 9,927,169 B2 | 3/2018 | Baker et al. |
| 9,943,802 B1 | 4/2018 | Ballaguet et al. |
| 10,024,835 B2 | 7/2018 | Sreekumar |
| 10,106,410 B2 | 10/2018 | Ballaguet et al. |
| 10,106,411 B2 | 10/2018 | Ballaguet et al. |
| 10,188,988 B2 | 1/2019 | Debrock et al. |
| 10,197,545 B2 | 2/2019 | Sreekumar et al. |
| 10,260,007 B2 | 4/2019 | Barroeta et al. |
| 10,260,010 B2 | 4/2019 | Soliman |
| 10,365,049 B2 | 7/2019 | Tso et al. |
| 10,386,284 B2 | 8/2019 | Zhang |
| 10,472,576 B2 | 11/2019 | Salu et al. |
| 10,479,684 B2 | 11/2019 | Ballaguet et al. |
| 10,508,033 B2 | 12/2019 | Ballaguet et al. |
| 10,513,663 B2 | 12/2019 | Soliman et al. |
| 10,589,223 B1 | 3/2020 | Raynel et al. |
| 10,662,061 B1 | 5/2020 | Lithoxoos et al. |
| 10,765,995 B2 | 9/2020 | Hamad et al. |
| 10,889,766 B2 | 1/2021 | Barreau et al. |
| 11,008,521 B1 | 5/2021 | Raynel et al. |
| 11,112,190 B2 | 9/2021 | Villette et al. |
| 11,131,660 B2 | 9/2021 | Ahmed et al. |
| 11,148,962 B2 | 10/2021 | Alghunaimi et al. |
| 2003/0082096 A1 | 5/2003 | Lynn |
| 2003/0099594 A1 | 5/2003 | Lyon |
| 2005/0158235 A1 | 7/2005 | Ramani et al. |
| 2005/0217479 A1 | 10/2005 | Hale et al. |
| 2006/0186340 A1 | 8/2006 | Lievois |
| 2006/0286675 A1 | 12/2006 | Coleman |
| 2007/0183953 A1 | 8/2007 | Kerley et al. |
| 2009/0166028 A1 | 7/2009 | Varadaraj et al. |
| 2009/0179636 A1 | 7/2009 | Chen |
| 2009/0321323 A1 | 12/2009 | Sharma et al. |
| 2010/0260551 A1 | 10/2010 | Jespersen et al. |
| 2010/0264014 A1 | 10/2010 | Mignon et al. |
| 2011/0073206 A1 | 3/2011 | Na |
| 2011/0138854 A1 | 6/2011 | Huang et al. |
| 2011/0185896 A1 | 8/2011 | Sethna et al. |
| 2011/0194105 A1 | 8/2011 | LaFrancois et al. |

(56) References Cited

U.S. PATENT DOCUMENTS

| | | | |
|---|---|---|---|
| 2011/0268650 A1* | 11/2011 | Lamar | C01B 17/0456 422/612 |
| 2011/0309463 A1 | 12/2011 | Kruglick | |
| 2012/0012804 A1 | 1/2012 | Chen | |
| 2012/0111051 A1 | 5/2012 | Kulkarni et al. | |
| 2012/0168154 A1 | 7/2012 | Chinn et al. | |
| 2012/0273367 A1 | 11/2012 | Themy et al. | |
| 2012/0323059 A1 | 12/2012 | Liu et al. | |
| 2013/0026082 A1 | 1/2013 | Al-Shafei et al. | |
| 2013/0104772 A1 | 5/2013 | Schabron et al. | |
| 2013/0110411 A1 | 5/2013 | Black et al. | |
| 2013/0213892 A1 | 8/2013 | Henthome et al. | |
| 2013/0277551 A1 | 10/2013 | Bourrel et al. | |
| 2014/0246382 A1 | 9/2014 | Matza et al. | |
| 2014/0262953 A1 | 9/2014 | Ng et al. | |
| 2014/0338395 A1 | 11/2014 | Oelfke et al. | |
| 2015/0106027 A1 | 4/2015 | Koseoglu et al. | |
| 2015/0136234 A1 | 5/2015 | Zulfiquar | |
| 2015/0152340 A1 | 6/2015 | Chemey et al. | |
| 2015/0175904 A1 | 6/2015 | Yeganeh et al. | |
| 2015/0225655 A1 | 8/2015 | Adams et al. | |
| 2015/0231555 A1 | 8/2015 | He et al. | |
| 2015/0240717 A1 | 8/2015 | Starcher et al. | |
| 2015/0267127 A1 | 9/2015 | Yeganeh et al. | |
| 2015/0290575 A1 | 10/2015 | Rothermel et al. | |
| 2015/0298972 A1 | 10/2015 | Ballaguet et al. | |
| 2016/0018049 A1 | 1/2016 | Yodogawa et al. | |
| 2016/0121258 A1 | 5/2016 | First | |
| 2016/0195344 A1 | 7/2016 | Tomita et al. | |
| 2016/0228813 A1 | 8/2016 | Schwartz | |
| 2017/0045290 A1 | 2/2017 | Ploeger et al. | |
| 2017/0190574 A1 | 7/2017 | Ercan et al. | |
| 2017/0254793 A1 | 9/2017 | Al-Amri | |
| 2017/0312682 A1 | 11/2017 | Keller | |
| 2017/0319984 A1 | 11/2017 | Oshinowo | |
| 2017/0320736 A1 | 11/2017 | Voss et al. | |
| 2017/0369791 A1 | 12/2017 | Khan et al. | |
| 2018/0031524 A1 | 2/2018 | Hassell | |
| 2018/0066194 A1 | 3/2018 | Soliman et al. | |
| 2018/0179097 A1 | 6/2018 | Navarro et al. | |
| 2018/0187095 A1 | 7/2018 | Soliman | |
| 2018/0195010 A1 | 7/2018 | Salu et al. | |
| 2018/0202726 A1 | 7/2018 | Tso et al. | |
| 2018/0216016 A1 | 8/2018 | Bakas et al. | |
| 2018/0291282 A1 | 10/2018 | Soliman | |
| 2018/0371876 A1 | 12/2018 | Lopez et al. | |
| 2019/0010052 A1 | 1/2019 | Ballaguet et al. | |
| 2019/0016598 A1 | 1/2019 | Ballaguet et al. | |
| 2019/0027615 A1 | 1/2019 | Zheng et al. | |
| 2019/0062645 A1 | 2/2019 | Al Seraihi et al. | |
| 2019/0136113 A1 | 5/2019 | Holtsclaw et al. | |
| 2019/0194526 A1 | 6/2019 | Holtsclaw et al. | |
| 2019/0211274 A1 | 7/2019 | Soliman et al. | |
| 2019/0227020 A1 | 7/2019 | Tamida et al. | |
| 2019/0240613 A1 | 8/2019 | Jean-Francois Raynel et al. | |
| 2019/0247770 A1 | 8/2019 | Oshinowo | |
| 2019/0353356 A1 | 11/2019 | Fischer | |
| 2020/0023310 A1 | 1/2020 | Luo et al. | |
| 2020/0028053 A1 | 1/2020 | Strano | |
| 2020/0040263 A1 | 2/2020 | Khuzzan et al. | |
| 2021/0031139 A1 | 2/2021 | Hamad et al. | |
| 2021/0080446 A1 | 3/2021 | Ahmed | |
| 2021/0172689 A1 | 6/2021 | Villette | |
| 2021/0189260 A1 | 6/2021 | Robert | |
| 2021/0363032 A1 | 11/2021 | Robert et al. | |
| 2021/0395619 A1 | 12/2021 | Raynel et al. | |
| 2021/0396731 A1 | 12/2021 | Duval et al. | |

FOREIGN PATENT DOCUMENTS

| | | |
|---|---|---|
| CA | 2968601 | 6/2016 |
| CN | 1386563 | 12/2002 |
| CN | 1844066 | 10/2006 |
| CN | 101522595 | 9/2009 |
| CN | 102085454 | 6/2011 |
| CN | 103980950 | 8/2014 |
| CN | 104001408 | 8/2014 |
| CN | 104520411 | 4/2015 |
| CN | 205534838 | 8/2016 |
| CN | 105974098 | 9/2016 |
| CN | 109696372 | 4/2019 |
| CN | 109882683 | 6/2019 |
| CN | 110127623 | 8/2019 |
| CN | 110280941 | 9/2019 |
| CN | 110711995 | 1/2020 |
| CN | 111167317 | 5/2020 |
| CN | 111365568 | 7/2020 |
| DE | 102004010650 | 9/2005 |
| EP | 0230683 | 8/1987 |
| EP | 0195447 | 10/1989 |
| EP | 0684066 | 11/1995 |
| EP | 2932239 | 10/2015 |
| EP | 3254010 | 12/2017 |
| EP | 2932248 | 2/2020 |
| FR | 2675709 | 10/1992 |
| FR | 2676006 | 11/1992 |
| GB | 1374010 | 11/1974 |
| GB | 2336668 | 10/1999 |
| GB | 0908527 | 5/2009 |
| JP | S56162001 | 12/1981 |
| JP | S 6140555 | 2/1986 |
| JP | 2001133450 | 5/2001 |
| JP | 3764701 | 4/2006 |
| KR | 20110134562 | 12/2011 |
| KR | 101947311 | 5/2019 |
| KR | 102128754 | 7/2020 |
| SU | 1183890 | 10/1985 |
| TW | I579034 | 4/2017 |
| WO | WO 93025636 | 12/1993 |
| WO | WO 2004022796 | 3/2004 |
| WO | WO 2005037883 | 4/2005 |
| WO | WO 2009111008 | 9/2009 |
| WO | WO 2010133315 | 11/2010 |
| WO | WO 2011069192 | 6/2011 |
| WO | WO 2015074739 | 5/2015 |
| WO | WO 2016069722 | 5/2016 |
| WO | WO 2016102568 | 6/2016 |
| WO | WO 2017008748 | 1/2017 |
| WO | WO 2017020919 | 2/2017 |
| WO | WO 2017220655 | 12/2017 |
| WO | WO 2018022756 | 2/2018 |
| WO | WO 2018097718 | 5/2018 |
| WO | WO 2018129228 | 7/2018 |
| WO | WO 2018165512 | 9/2018 |
| WO | WO 2018169903 | 9/2018 |
| WO | WO 2018236644 | 12/2018 |
| WO | WO 2013068320 | 5/2019 |
| WO | WO 2019171409 | 9/2019 |
| WO | WO 2020225060 | 11/2020 |
| WO | WO 2020225061 | 11/2020 |
| WO | WO 2020225062 | 11/2020 |
| WO | WO 2020225063 | 11/2020 |
| WO | WO 2021113572 | 6/2021 |

OTHER PUBLICATIONS

U.S. Appl. No. 16/741,853, filed Jan. 24, 2020, Raynel et al.
U.S. Appl. No. 17/009,573, filed Sep. 1, 2020, Villete et al.
U.S. Appl. No. 17/009,579, filed Sep. 1, 2020, Villete et al.
U.S. Appl. No. 17/103,685, filed Nov. 24, 2020, Villete et al.
Abiev et al., "Non-thermal plasma for process and energy intensification in dry reforming of methane," Catalysts, Nov. 2020, 10:1358.
Abrams et al., "Use of seawater in flue gas desulfurization," JAPCA, 1988, 38(7):969-974, 7 pages.
AiQahtani et al., "One-Step Low-Temperature Reduction of Sulfur Dioxide to Elemental Sulfur by Plasma-Enhanced Catalysis," ACS Catal., 2020, 10: 5272-5277, 6 pages.
AiQahtani et al., "Plasma-assisted catalytic reduction of SO2 to elemental sulfur: Influence of nonthermal plasma and temperature on iron sulfide catalyst," Journal of Catalysis, Nov. 2020, 391: 260-272, 13 pages.

(56) References Cited

OTHER PUBLICATIONS

Amo et al., "Low-Quality Natural Gas Sulfur Removal/Recovery," Membrane Technology and Research, DOE Report DE-AC21-92MC28133—01, Jan. 29, 1998, 107 pages.

An et al., "Synthesis and SO2 Absorption/Desorption Properties of Poly(1,1,3,3-tetramethylguanidine acrylate)," Macromolecules, Apr. 2007, 40(9):3388-3393.

Andreasen et al., "Use of Seawater Scrubbing for SO2 Removal from Marine Engine Exhaust Gas", Energy & Fuels, 2007, 21:3274-3279, 6 pages.

Aschoundong et al., "Silane Modification of Cellulose Acetate Dense Films as Materials for Acid Gas Removal Macromolecules," American Chemical Society (ASC) Publications, Macromolecules 46:14 (5584-5594), Jul. 9, 2013, 11 pages.

ASTM "D 3921-85: Standard test method for oil and grease and petroleum hydrocarbons in water," 1985 (reapproved 1990), ASTM International, 5 pages.

ASTM "D 7066-04, Standard test method for dimer/trimer of chlorotrifluoroethylene (S-316) recoverable oil and grease and nonpolar by Infared determination," 2007, 9 pages.

ASTM International, "D 4281-95: Standard test method for oil and grease (fluorocarbon extractable substances) by gravimetric determination," An American Standard, 1995, reapproved 2005, 6 pages.

Belov et al., "Gas transport and free volume in hexafluoropropylene polymers," Journal of Membrane Science, vol. 383, Nov. 2011, 8 pages.

Ben-Shebil, "Effect of heat of adsorption on the adsorptive drying of solvents at equilibrium in a packed bed of zeolite," Chemical Engineering Journal, 74:3 (197-204), Jul. 1999, 8 pages.

Bernardo et al., "Gas transport properties of Pebax/room temperature ionic liquid gel membranes" Separation and Purification Technology 97: 73-82, Sep. 2012, 13 pages.

Bhide et al., "Hybrid processes for the removal of acid gases from natural gas," Journal of Membrane Science 140:1 (27-49), Mar. 4, 1998, 2 pages, Abstract Only.

Bogaerts et al., "CO2 conversion by plasma technology: Insights from modeling the plasma chemistry and plasma reactor design," Plasma Sources Science and Technology, May 2017, 26(6):063001.

Bogaerts et al., "Plasma-based conversion of CO2: Current status and future challenges," Faraday Discussions, 2015, 183:217-232.

Bothamley, "Quantifying Oil/water Separation Performance in Three-Phase Separators—Part 1," Mar. 22, 2017, Mark Bothamley Consulting LLC., 14 pages.

Chatteijee et al., "Poly(ether urethane) and poly(ether urethane urea) membranes with high $H_2S/CH_4$ selectivity," Journal of Membrane Science 135:99 (99-106), Nov. 1997, 8 pages.

Chen et al,: "High CO2 permeability of ceramic-carbonate dual-phase hollow fiber membrane at medium-high temperature", Journal of Membrane Science, Mar. 2020, 597:117770.

Christopoulos, "Reliable computations of knee point for a curve and introduction of a unit invariant estimation," National and Kapodistrian University of Athens, Dec. 2014, 9 pages.

Cirne et al., "Methods for Determination of Oil and Grease Contents in Wastewater from the Petroleum Industry," Chemistry and Chemical Technology 10:4, 2016, 8 pages.

Cui et al., "Ultrahigh and Selective SO2 Uptake in Inorganic Anion-Pillared Hybrid Porous Materials," Advanced Materials, May 2017, 29(28):1606929.

Curcio, Efrenn, et al. "Hybrid nanofiltration—membrane crystallization system for the treatment of sulfate wastes." Journal of Membrane Science 360.1-2 (2010): 493-498 (Year: 2010).

Dang et al., "Research on decomposition of hydrogen sulfide using non-thermal plasma with metal oxide catalysis," Energy Procedia, 2012, 16:856-862.

De Bie et al., "Fluid modeling of the conversion of methane into higher hydrocarbons in an atmospheric pressure dielectric barrier discharge," Plasma Processes and Polymers, 2011, 8(11):1033-1058.

Delfino, J. R. et al, "A simple and fast method to determine water content in biodiesel by electrochemical impedance spectroscopy," Taianta 2018, 179, 753-759, 26 pages.

Diomede et al., "Insight into CO dissociation in plasmas from numerical solution of a vibrational diffusion equation," J. Phys. Chem. C, Aug. 2017, 121(36)19568-19576.

Elinoff et al, "Thermal diode can control direction of heat flow," Electronic Products Magazine, Apr. 2017, 2 pages.

EPA "Oil and Grease (Spectrophotometric, Infrared)," Method # 413.2, Storet No. 00560, Issued in 1974, Editorial revision 1978, Standard test method for Oil and grease analysis using Freon extraction and IR absorbance without the Freon extract being treated by silica gel, 3 pages.

EPA, "Method 1664, Revision A: N—Hexane Extractable Material (HEM; Oil and Grease) and Silica Gel Treated N-Hexane Extractable Material (SGT-HEM; Non-polar material) by Extraction and Gravimetry," United States Environmental Protection Agency, Office of Water, Washington D.C., EPA-821-R-98-002, PB99-121949, Feb. 1999, 28 pages.

EPA, "Method 1664, Revision B: n-Hexane Extractable Material (HEM; Oil and Grease) and Silica Gel Treated n-Hexane Extractable Material (SGT-HEM; Non-polar Material) by Extraction and Gravimetry," United States Environmental Protection, Office of Water Agency, Feb. 2010, 35 pages.

EPA, "Oil and Grease (Gravimetric, Separatory Funnel Extraction)," Method # 413.1, Storet No. 00556, Issued in 1974, Editorial revision 1978, Standard test method for oil and grease using gravimetric determination, approved for NPDES, 3 pages.

EPA, "Petroleum Hydrocarbons (Spectrophotometric, Infrared)," Method # 418.1, Storet No. 45501, Issued in 1978, Petroleum Hydrocarbons, 3 pages.

Foruny, "Measuring Salinity in crude oils: Evaluation of methods and an improved performance," 2008, Fuel, 1241-1248 (Year: 2008).

Froschauer et al., "No. Matter of Course: Ionic Liquids as SO2-Selective Gas Absorbers," Lenzinger Berichte, Jan. 2013, 91:30-43.

Gabrus et al., "Experimental studies on 3A and 4A zeolite molecular sieves regeneration in TSA process: Aliphatic alcohols dewatering-water desorption," Chemical Engineering Journal 259: 232-242, Jan. 2015, 11 pages.

Glasoe et al, "Solubility of water and deuterium oxide in carbon tetrachloride, toluene, and cyclohexane at various temperatures," Journal of Chemical & Engineering Data, 17(1): 66-68, 1972, 3 pages.

Hasenberg, "Sulfur Dioxide," in G. Kreysa and M. Schutze, Corrosion Handbook, vol. 10: Sulfur Dioxide, sodium sulfate, p. 5-37, Weinheim: Wiley, May 2008.

Hatcher, Nathan A. et al—Sour water stripping Part 2: phenolic water—Digital Refining, Aug. 2014.

Heijkers et al., "Plasma-based CH4 conversion into higher hydrocarbons and H2: Modeling to reveal the reaction mechanisms of different plasma sources," Journal of Physical Chemistry, May 2020, 124:7016-7030.

Hibbard and Schalla, "NACA Research Memorandum: Solubility of Water in Hydrocarbons," National Advisory Committee for Aeronautics, Washington, Jul. 10, 1952, 27 pages.

Huang et al., "Facilitated separation of CO2 and SO2 through supported liquid membranes using carboxylate-based ionic liquids," Journal of Membrane Science, Dec. 2014, 471:227-236.

International Standard, "ISO 5667-3: Water quality—sampling—part 3: guidance on the preservation and handling of water samples," 3rd edn, Dec. 15, 2003, 38 pages.

International Standard, "ISO 9377-2: Water quality—determination of hydrocarbon oil index—Part 2: Method using solvent extraction and gas chromatography," First edition, Oct. 15, 2000, 24 pages.

IP, "Determination of the oil content of effluent water—extraction and infra-red spectrometric method," IP 429/98, Oil in Water, 2012, 5 pages.

Jansen et al., "On the unusual solvent and the effect on the gas transport in perfluorinated Hyflon AD Membranes," Journal of Membrane Science 287:1 (132-137), Jan. 2007, 6 pages.

(56) References Cited

OTHER PUBLICATIONS

Johnson et al, "The Molecular Complexity of Water in Organic Solvents Part II," J. Chem. Soc. A, Inorganic Phys. Theoretical 77-78, 1966, 2 pages.

Kado et al., "Diagnosis of atmospheric pressure low temperature plasma and application to high efficient methane conversion", Catal. Today, Feb. 2004, 89:47-55.

Kanna et al., "Estimating the Amount of Moisture Content in Crude Oil Samples," International Refereed Journal of Engineering and Science (IRJES), Feb. 2017, 6(2): 59-62, 4 pages.

Khalifeh et al., "Decomposition of methane to hydrogen using nanosecond pulsed plasma reactor with different active volumes, voltages and frequencies", Appl. Energy, May 2016, 169:585-596.

Kikkinides et al., "Gas Separation and Purification by Polymeric Adsorbents: Flue Gas Desulfurization and S02 Recovery with Styrenic Polymer," Ind. Eng. Chem. Res., Oct. 1993, 32(10):2365-2372.

Kim et al., "Effect of Demulsifier Partitioning on the Destabilization of Water-in-Oil Emulsions," Ind. Eng. Chem. Res., 1996, 35: 1141-1149, 9 pages.

Kim et al., "Separation performance of PEBAX/PEI hollow fiber composite membrane for SQ2/CO2/N2 mixed gas," Chemical Engineering Journal, Nov. 2013, 233:242-250.

Kirchnerová et al, "The Solubility of Water in Low-Dielectric Solvents," Can. J. Chem 54(24): 3909-3916, Aug. 26, 1976, 8 pages.

Klaehn et al., "Humidified Gas stream Separation at High Temperatures Using Matrimid 5218," Separation Science and Technology, Nov. 2012, 47(14-15):2186-2191.

Knauss et al, "The solubility of p-xylene in water as a function of temperature and pressure and calculated thermodynamic quantities," Geochimica et Cosmochimica Acta vol. 59(12): 2443-2448, Jun. 1995, Mar. 1995, 6 pages.

Ko et al., "Analysis of purge gas temperature in cyclic TSA process," Pergmon, Chemical Engineering Science 57(1): 179-195, Jan. 2002, 17 pages.

Kraftschik et al., "Dense film polyimide membranes for aggressive sour gas feed separations," Journal of Membrane Science 428: 608-619, Feb. 1, 2013, 12 pages.

Kriebel, "Absorption, 2. Design of Systems and Equipment," Ullmann's Encyclopedia of Industrial Chemistry, 2012, 18 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processing, Operations & Maintenance, Gas, Apr. 2012, 14 pages.

Lancia, et al., "Uncatalyzed heterogenous oxidation of calcium bisulfite," Chemical Engineering Science, Aug. 1996, 51(16), 3889-3896.

Lee et al., "Diamine-Anchored Polystyrene Resins for Reversible SO2 Adsorption," ACS Sustainable Chem. Eng., Feb. 2016, 4(4):2012-2019.

Lockhart, "Sour oil and gas management: 3.3," New Upstream Technologies, vol. III/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346: 270-279, Jan. 2010, 10 pages.

Lu et al., "Conversion of natural gas to C2 hydrocarbons via cold plasma technology," Journal of Natural Gas Chemistiy, Jul. 2010, 19(4):375-379.

Maitre et al., "Plasma-enhanced catalysis for the upgrading of methane: A review of modelling and simulation methods," Reaction Chemistiy & Engineering, Mar. 2020, 5:814-837.

Mandal et. al., "M.A.L.D.I.-T.O.F. mass spectrometry characterization of 4-alkyl substituted phenol-formaldehyde novalac type resins," Polymer, 1997, 38(26):6267-6271, 5 pages.

Martínez-Salazar et al., "Hydrogen production by methane reforming with H2S using Mo. Cr/ZrO2—SBA15 and Mo, Cr/ZrO2—La2O3 catalyst," Int. J. Hydrogen Energy, Dec. 2015, 48:17272-17283.

masterbond.com [online], "Epoxies with Low Coefficient of Thermal Expansion," available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.

Merkel and Toy, "Comparison of Hydrogen Sulfide Transport Properties in Fluorinated and Nonfluorinated Polymers," Macromolecules 39:22 (7591-7600), Sep. 2006, 10 pages.

Michell Instruments (online), "Impedance," Impedance Products, URL: <http://www.michell.com/uk/technology/impedence.htm> retrieved Sep. 9, 2019, available on or before Jun. 2019, 2 pages.

Mogildeea et al., "The assessment of carbon dioxide dissociation using a single-mode microwave plasma generator," Molecules, Mar. 2020, 25:1558.

Neisi, Effect of Mixing Efficiency in Dilution Water Consumption in a Crude Oil Desalting Plant, 2011, 3rd International Conference on Chemical, Biological and Environmental Engineering, vol. 20, 109-113. (Year: 2011).

Odberg et al, "Studies of water in organic solvents using NMR and partition techniques-II Di-isopropyl ether, dibutyl phthalate and chloroform," Journal of Inorganic and Nuclear Chemistry 34:8 (2605-2616), Aug. 1972, Mar. 18, 1971, 12 pages.

Oikawa et al., "Seawater Flue Gas Deslfurization: Its Technical Implications and Performance Results," Environmental Progress, Apr. 2003, 22(1):67-73, 7 pages.

Paidar et al., "Membrane electrolysis—History, current status and perspective," Electrochimica Acta., 2016, 209: 737-756.

Palma et al., "A review about the recent advances in selected nonthermal plasma assisted solid-gas phase chemical processes," Nanomaterials, 2020, 10:1596.

PCT Application No. PCT/IB2019/061417, Lithoxoos et al., Regeneration Schemes for a Two Stage Adsorption Process for Claus Tail Gas Treatment, filed Dec. 28, 2019, 75 pages.

Ramakers et al., "Gliding arc plasmatron: Providing an alternative method for carbon dioxide conversion," ChemSusCHem, 2017, 10(12):2642-2652.

Ramasubramanian, "CO2 (H2S)-selective membranes for fuel cell hydrogen purification and flue gas carbon capture: an experimental and process modeling study", Dissertation for the degree of Doctor of Philosophy, Ohio state University, 2013, 270 pages.

Raynel et al., "A new method to select demulsifiers and optimize dosage at wet crude oil separation facilities," Oil & Gas Science and Technology—Rev. IFP Energies Nouvelles, 2021, 76(19), 11 pages.

Reddy et al., "Kinetics of hydrogen sulfide decomposition in a DBD plasma reactor operated at high temperature," Journal of Energy Chemistry, 2013, 22:382-386.

Ren et al., "Ionic liquids: Functionalization and absorption of SO2," Green Energy & Environment, Jul. 2018, 3(3):179-190.

Robeson, "The upper bound revisited," Journal of Membrane Science 320 (390-400), Jul. 15, 2008, 11 pages.

Roy et al., "Aspen-HYSYS Simulation of Natural Gas Processing Plant," Journal of Chemical Engineering, IEB, Dec. 2011, 26:1, 4 pages.

Rufford et al., "The removal of CO2 and N2 from natural gas: A review of conventional and emerging process technologies," Journal of Petroleum Science and Engineering 94-95: 123-154, Sep. 2012, 32 pages.

Schei et al., "Transient simulations of gas-oil-water separation plants," Modeling, Identification and Control, 1991, 12:1 (27-46), 20 pages.

Sensorland.com (online), "Impedance Moisture Sensor Technology," How Sensors work—Moisture Sensors, retrieved from URL: <http://www.sensorland.com/HowPage029.html>, retrieved Sep. 9, 2019, 2 pages.

(56) References Cited

OTHER PUBLICATIONS

Shell Global Solutions International BV, "Cansolv Technologies Inc. SO2 Scrubbing System" fact sheet, 2010.
Simo et al., "Adsorption/Desorption of Water and Ethanol on 3A Zeolite in Near-Adiabatic Fixed Bed," Ind. Eng. Chem. Res. 48, 20, Sep. 2009, 14 pages.
Sivalls et al., "Oil and Gas Separation Design Manual," Section: 300, Technical Bulletin, Feb. 10, 2009, 142:7, 63 pages.
Sun et al., "Application of seawater to enhance SO2 removal from simulated flue gas through hollow fiber membrane contactor," Journal of Membrane Science, 2008, 312:6-14, 9 pages.
Tailor et al., "Supported Polytertiary Amines: Highly Efficient and Selective SO2 Adsorbents," Environ. Sci. Technol., Jan. 2014, 48(3):2025-2034.
Vaisala (online), "Vaisala HUMICAP Sensor for Measuring Moisture in Oil," Technology Description, retrieved from URL: <https://www.vaisala.com/sites/default/files/documents/HUMICAP-for-Moisture-in-oil-B211231EN-A.pdf> 2012, 2 pages.
Vasudevan, "Membranes and Diaphragms for Electrochemical Processes (Part-I)," Res. J. Chem. Sci., Feb. 2013, 3(2): 1-3.
Waterston, Katie, Dorin Bejan, and Nigel J. Bunce. "Electrochemical oxidation of sulfide ion ata boron-doped diamond anode." Journal of applied electrochemistiy 37.3 (2007): 367-373. (Year: 2007).
Weiland, Ralph H. et al—Distribution of HCN in sour water systems—Digital Refining, Apr. 2014 (Year: 2014).
Whitehead, "Plasma-catalysis: The known knowns, the known unknowns and the unknown unknowns," Journal of Physics, May 2016, 49:243001.
Wikipedia.com [online] "Thermal Diode," last revised Feb. 2019, retrieved on Oct. 7, 2019, retrieved from URL <https://en.wikipedia.org/wiki/Thermal_diode>, 2 pages.
Wikipedia.com [online], "Dielectric barrier discharge," Retrived Oct. 29, 2021 from URL <https://en.wikipedia.org/wiki/Dielectric_barrier_discharge>, 7 pages.
Wu et al., "Effect of Demulsifier Properties on Destabilization of Water-in-Oil Emulsion," May 2003, Energy & Fuels, 2003, 17: 1554-1559, 6 pages.
Wu et al., "Preparation and SO2 Absorption /Desorption Properties of Crosslinked Poly(1,1,3,3-Tetramethylguanidine Acrylate) Porous Particles," Macromolecular Rapid Communications, Nov. 2006, 27(22): 1949-1954.
www.digitalrefining.com [online], "Labsorb: A regenerable wet scrubbing process for controlling SO2 emissions," Jan. 2001, retrieved on Jan. 11, 2022, retrieved from URL<https://www.digitalrefining.com/article/1000818/labsorb-a-regenerable-wet-scrubbing-process-for-controlling-so2-emissions#.Yd3Ha9HMKUk>, 2 pages.
Xia et al., "Efficient, Selective, and Reversible SO2 Capture with Highly Crosslinked Ionic Microgels via a Selective Swelling Mechanism," Advanced Functional Materials, Jan. 2018, 28(13):1704292.
Xu et al., "Non-thermal plasma catalysis for CO2 conversion and catalyst design for the process," J. Phys. D: Appl. Phys. Mar. 2021, 54:233001.
Xuan et al., "Plasma oxidation of H2S over non-stoichiometric LaxMnO3 perovskite catalysts in a dielectric barrier discharge reactor," Catalysts, Aug. 2018, 8:317.
Yang, "Chapter 2: Measurement of Oil in Produced Water," in Lee et al., Produced water, 57-88, Springer Science+Business Media, 2011, 32 pages.
Zhao et al., "Decomposition of hydrogen sulfide in non-thermal plasma aided by supported CdS and ZnS semiconductors", Green Chemistry, Apr. 2013, 15:1509-1513.
Zhao et al., "SO2 Absorption by Carboxylate Anion-Based Task-Specific Ionic Liquids: Effect of Solvents and Mechanism," Ind. Eng. Chem. Res., Dec. 2016, 55(50):12919-12928.
Zou et al., "CO2—Selective polymeric membranes containing amines in crosslinked poly (vinyl alcohol)," Journal of Membrane Science, Dec. 2006, 286:310-321.

* cited by examiner

TREATING SULFUR DIOXIDE CONTAINING STREAM BY ACID AQUEOUS ABSORPTION

TECHNICAL FIELD

This document relates to methods and systems to remove sulfur-containing compounds from a gaseous stream, for example sulfur-containing streams generated during wellbore drilling or in a gas-oil separation plant.

BACKGROUND

As governmental environmental restrictions become increasingly stringent, the removal of sulfur-containing compounds from emissions is increasingly important. In some instances, sulfur recovery minimums are as high as 99.95%. A simplified and reliable tail gas treatment of sulfur recovery units is therefore needed.

SUMMARY

Provided herein are systems and methods for removing the sulfur-containing compounds from a gas stream, for example, from the tail gas of a Claus process.

In some implementations, a method for treating a tail gas of a Claus process to remove sulfur-containing compounds includes combusting a tail gas of a Claus process in an excess of oxygen gas, wherein the excess of oxygen gas includes a number of moles of oxygen exceeding the number of moles of oxygen required to fully combust the sulfur-containing compounds. Combusting the tail gas of the Claus process in an excess of oxygen gas yields a thermal oxidizer effluent, wherein the thermal oxidizer effluent includes sulfur dioxide, water vapor, and oxygen. The method includes cooling the thermal oxidizer effluent to yield a cooled thermal oxidizer effluent, flowing the cooled thermal oxidizer effluent to a quench tower, contacting the cooled thermal oxidizer effluent in the quench tower with a dilute aqueous acid quench stream to condense water vapor and dissolve the sulfur dioxide to yield sulfurous acid, hydrated sulfur dioxide, or a combination of sulfurous acid and hydrated sulfur dioxide, oxidizing the sulfurous acid or hydrated sulfur dioxide with oxygen from the thermal oxidizer effluent to yield a produced dilute aqueous acid stream that includes sulfuric acid, cooling the produced dilute aqueous acid stream to yield a cooled dilute aqueous acid stream, splitting the cooled dilute aqueous acid stream into the dilute aqueous acid quench stream and a dilute aqueous acid buffer stream, and flowing the dilute aqueous acid quench stream to the quench tower.

This aspect, taken alone or combinable with any other aspect, can include the following features. The method further includes flowing the dilute aqueous acid buffer stream to a water treatment unit, wherein the water treatment unit yields a permeate that is substantially water and a retentate that is concentrated sulfuric acid.

This aspect, taken alone or combinable with any other aspect, can include the following features. Contacting the cooled thermal oxidizer effluent in the quench tower with a dilute aqueous acid quench stream to condense water vapor and dissolve the sulfur dioxide to yield a produced dilute aqueous acid stream that includes sulfurous acid, hydrated sulfur dioxide, or a combination of sulfurous acid and hydrated sulfur dioxide yields a produced dilute aqueous acid stream that includes between about 2 and about 20 wt % sulfuric acid.

This aspect, taken alone or combinable with any other aspect, can include the following features. Splitting the cooled dilute aqueous acid stream into the dilute aqueous acid quench stream and the dilute aqueous acid buffer stream includes splitting the cooled dilute aqueous acid stream into the dilute aqueous acid quench stream and a dilute aqueous acid buffer stream, wherein the dilute aqueous acid buffer stream includes approximately the same volume as the water condensed from the thermal oxidizer effluent.

This aspect, taken alone or combinable with any other aspect, can include the following features. Splitting the cooled dilute aqueous acid stream into the dilute aqueous acid quench stream and a dilute aqueous acid buffer stream includes splitting the cooled dilute aqueous acid stream evenly, wherein the dilute aqueous acid quench stream and the dilute aqueous acid buffer stream each comprise approximately 50% of the cooled dilute aqueous acid stream.

This aspect, taken alone or combinable with any other aspect, can include the following features. The method further includes contacting the sulfur dioxide with a fresh water stream, oxidizing sulfurous acid, hydrated sulfur dioxide, or both into sulfuric acid with the excess of oxygen in the thermal oxidizer effluent, recovering a portion of the fresh water stream, monitoring the pH of the recovered water, and in response to a pH of the recovered water that is less than 0.5, flowing the recovered water to the water treatment unit.

This aspect, taken alone or combinable with any other aspect, can include the following features. The method further includes flowing the permeate of the water treatment unit to the quench tower as the fresh water stream.

This aspect, taken alone or combinable with any other aspect, can include the following features. The retentate of the water treatment unit is flowed to a sulfur recovery unit to enrich a Claus furnace in oxygen.

In some implementations, a system for removing sulfur-containing compounds from a gas includes a thermal oxidizer configured to receive a gas comprising sulfur-containing compounds and to combust the sulfur-containing compounds in an excess of oxygen gas, wherein the excess of oxygen gas comprises a number of moles of oxygen exceeding the number of moles of oxygen required to fully combust the sulfur-containing compounds, to yield a thermal oxidizer effluent that contains sulfur dioxide. The system includes a waste heat recovery system coupled to the thermal oxidizer and configured to cool the thermal oxidizer effluent to yield a cooled thermal oxidizer effluent. The system includes a quench tower coupled to the waste heat recovery system and configured to receive the cooled thermal oxidizer effluent, and contact the cooled thermal oxidizer effluent with a dilute aqueous acid quench stream to dissolve the sulfur dioxide to sulfurous acid, hydrated sulfur dioxide, or a combination of sulfurous acid and hydrated sulfur dioxide, oxidize the sulfurous acid, hydrated sulfur dioxide, or both to sulfuric acid, and yield a produced dilute aqueous acid stream comprising sulfuric acid. The system includes a cooler system coupled to the quench tower, wherein the quench tower is configured to flow the produced dilute aqueous acid stream to the cooler system. The cooler system is configured to receive the produced dilute aqueous acid stream, cool the produced dilute aqueous acid stream to yield a cooled dilute aqueous acid stream, split the cooled dilute aqueous acid stream into the dilute aqueous acid quench stream and a dilute aqueous acid buffer stream, and flow the dilute aqueous acid quench stream to the quench tower.

This aspect, taken alone or combinable with any other aspect, can include the following features. The system includes a water treatment unit, wherein the water treatment unit is coupled to the cooler system and configured to receive the dilute aqueous acid buffer stream from the cooler system, and wherein the water treatment unit is configured to yield a permeate stream that is substantially water and a retentate stream that is concentrated sulfuric acid.

This aspect, taken alone or combinable with any other aspect, can include the following features. The system includes a buffer tank coupled between the cooler system and the water treatment unit, wherein the buffer tank is configured to receive the dilute aqueous acid buffer stream and to flow the dilute aqueous acid buffer stream to the water treatment unit.

This aspect, taken alone or combinable with any other aspect, can include the following features. The buffer tank includes a vent, wherein the vent is coupled to the quench tower and configured to flow undissolved gases to the quench tower.

This aspect, taken alone or combinable with any other aspect, can include the following features. The waste heat recovery system is configured to cool the thermal oxidizer effluent to a temperature of about 330° F. (166° C.).

This aspect, taken alone or combinable with any other aspect, can include the following features. The dilute aqueous acid quench stream has a temperature between about 110° F. (43° C.) and about 130° F. (54° C.).

This aspect, taken alone or combinable with any other aspect, can include the following features. The produced dilute aqueous acid stream comprises between about 2 and about 20 wt % of sulfuric acid.

This aspect, taken alone or combinable with any other aspect, can include the following features. The water treatment unit is a reverse osmosis membrane treatment unit, and wherein the reverse osmosis membrane treatment unit yields a permeate that is substantially water and a retentate that is about 70 to about 90 wt % sulfuric acid.

This aspect, taken alone or combinable with any other aspect, can include the following features. The retentate is flowed to a sulfur recovery unit to enrich a Claus furnace in oxygen.

This aspect, taken alone or combinable with any other aspect, can include the following features. The quench tower includes an upper section, a mid-section, and a lower section, wherein the upper section and the lower section are connected in the mid-section by a perforated plate, wherein the perforated plate redistributes the dilute aqueous acid quench stream on the lower section of the quench tower.

This aspect, taken alone or combinable with any other aspect, can include the following features. The quench tower includes an upper section, a mid-section, and a lower section, wherein the upper section and the lower section are connected in the mid-section by a plate, wherein the plate comprises bubble caps, wherein the plate is configured to collect liquid and allow gas to pass through the plate.

This aspect, taken alone or combinable with any other aspect, can include the following features. The system includes a second buffer tank coupled between the quench tower and a second cooler, wherein the second buffer tank is configured to receive recovered water from the quench tower, and wherein the second buffer tank includes a second vent, and the second vent is coupled to the quench tower and configured to flow undissolved gases to the quench tower. The system includes a fresh water stream, wherein the fresh water stream enters the quench tower at the upper section of the quench tower, and wherein the plate is configured to recover fresh water and flow the recovered water to the second buffer tank. The system includes a second cooler, wherein the second cooler is configured to cool the recovered water from the second buffer tank and flow the cooled recovered water to the quench tower as the fresh water stream. The system includes a pH monitor configured to monitor the pH of the recovered water, wherein the second buffer tank is configured to flow the recovered water to the buffer tank via a valve when the pH of the recovered water is below 0.5, and wherein the water treatment unit is configured to flow the permeate stream to the quench tower as the fresh water stream.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
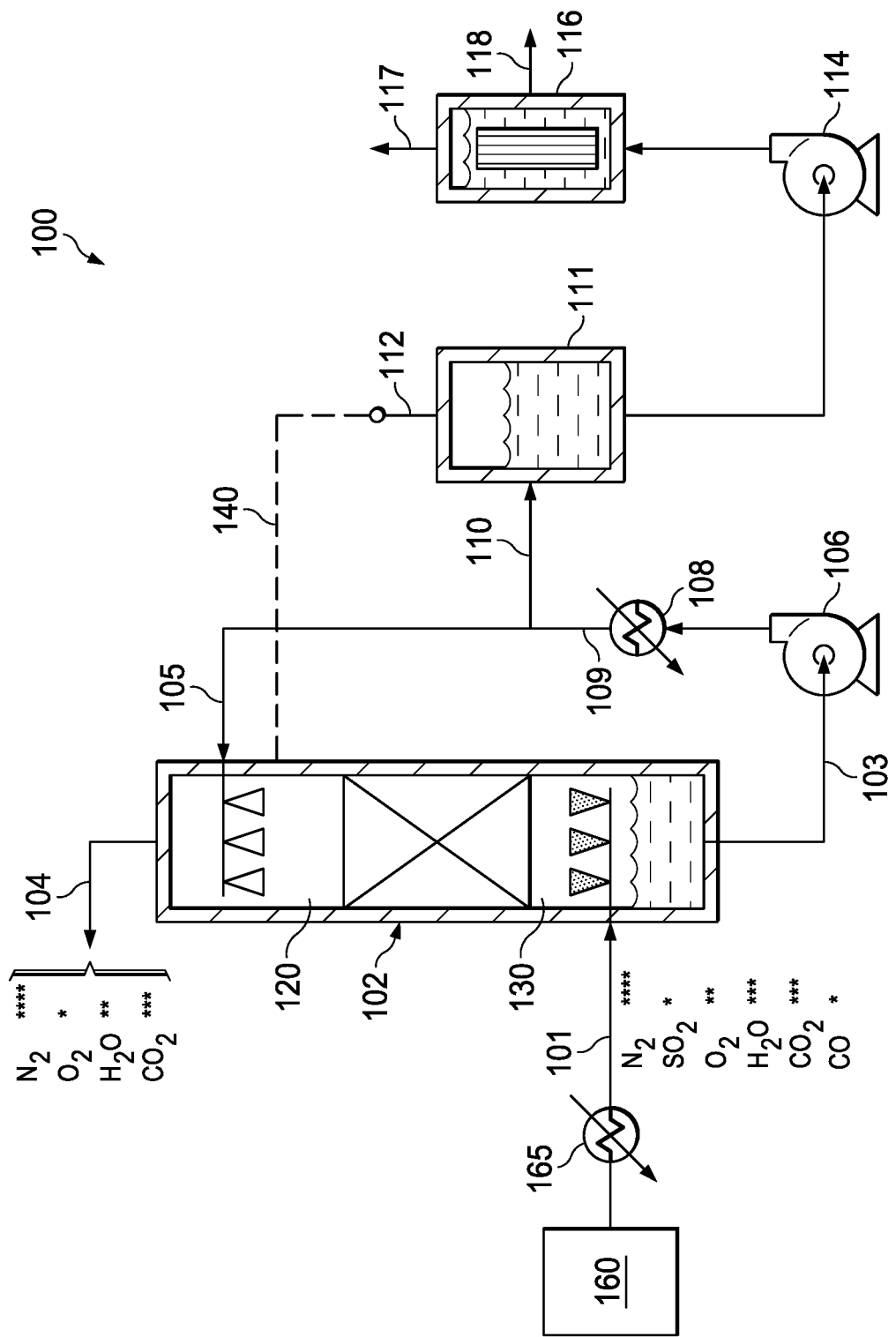
FIG. 1 is an example schematic of a system 100 for removing sulfur-containing compounds from a gas.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are methods and systems for removing sulfur compounds from a gas stream, for example, the tail gas of a Claus process. The techniques described in this disclosure can be implemented to more efficiently treat the tail gas of a Claus process compared to currently available methods. Compared to currently available methods, the techniques described here offer higher percentage of sulfur recovery and are comparatively less expensive.

A Claus process is a method of removing the hydrogen sulfide from natural gas, crude oil, or other industrial fluids or gases. The Claus process consists of two steps:

$$2H_2S + 3O_2 \rightarrow 2SO_2 + 2H_2O \qquad \text{Eq. 1}$$

$$4H_2S + 2SO_2 \rightarrow 6S + 4H_2O \qquad \text{Eq. 2}$$

The tail gas of a Claus process contains sulfur dioxide ($SO_2$), hydrogen sulfide ($H_2S$), carbon dioxide ($CO_2$), nitrogen gas ($N_2$), hydrogen gas ($H_2$), water ($H_2O$), carbon monoxide (CO), carbonyl sulfide (COS), traces of carbon sulfide ($CS_2$), and allotropes of sulfur ($S_6$, $S_7$, and $S_8$). Treatment or separation of the components of the tail gas is difficult.

Described herein are methods and systems for treating the tail gas that contains sulfur compounds, for example the tail gas of a Claus process. The methods and systems are capable of removing a multitude of different sulfur-containing compounds from a tail gas by converting the sulfur compounds to $SO_2$, contacting the $SO_2$ with an aqueous solution dissolve the $SO_2$, and oxidizing the hydrated $SO_2$ to sulfuric acid. The produced sulfuric acid can then be monetized or used in subsequent processes. For example, the produced sulfuric acid can be used in dyes, paper, glass, astringents, batteries, drain cleaners, metal processing, and fertilizer manufacture.

In some implementations, the tail gas of a Claus process is combusted with a fuel gas, for example, $CH_4$ or $C_2H_6$, in a thermal oxidizer. The combustion occurs with an excess of oxygen gas. An excess oxygen gas includes a number of moles of oxygen exceeding the number of moles of oxygen required to fully combust the sulfur-containing compounds. In some implementations, the oxygen gas is supplied by ambient air. The thermal oxidizer yields an exhaust gas, i.e., a thermal oxidizer effluent, that contains about 2-3 vol % of $O_2$, along with $SO_2$, $CO_2$, $N_2$, $H_2O$, and traces of CO. This effluent is cooled by contact with a chilled acidic water. This contact also condenses water vapor in the exhaust gas. Further, $SO_2$ from the thermal oxidizer effluent dissolves and hydrates in water, and, in the aqueous phase, reacts with the excess of oxygen present in the thermal oxidizer effluent to yield to a mixture of sulfurous acid ($H_2SO_3$) and sulfuric acid ($H_2SO_4$). The oxidation of $SO_2$ is thermodynamically allowed in water, however, this reaction will not occur in the gas phase. The generated sulfurous and sulfuric acids in the chilled acidic water yield an aqueous sulfurous/sulfuric mixture acid stream. The aqueous sulfurous/sulfuric acid stream is cooled further and split into two streams. A first stream is sent back into the quench tower as the chilled acidic water coolant. A second stream is processed to yield a weakly acidic water and a concentrated sulfurous/sulfuric acid stream. The weakly acidic water can be send to an evaporation pond or reused. The concentrated sulfurous/sulfuric acid stream can be monetized or sent to a sulfur recovery unit (SRU) to enrich a Claus furnace in oxygen. In some implementations, this can help a plant, business, commercial enterprise, or other emissions-producing entity achieve sulfur recovery or emission targets.

Advantageously, this approach is capable of removing a wide variety of sulfur-containing species in the tail gas of a Claus process by transforming sulfur-containing species into sulfur dioxide via combustion, followed by subsequent transformation into sulfuric acid in a quench tower via absorption and oxidation with an excess of oxygen.

FIG. 1 is an example schematic of a system 100 for removing sulfur-containing compounds from a gas. The system 100 includes a one-stage quench tower 102 for $SO_2$ removal from thermal oxidizer effluent 101. The thermal oxidizer effluent 101 is the result of the complete combustion of hydrogen sulfide and other sulfur-containing compounds, for example, COS and $CS_2$, in a thermal oxidizer 160. The thermal oxidizer effluent 101 contains $N_2$, $SO_2$, $O_2$, $H_2O$, $CO_2$, and CO. The stars (*) shown in FIG. 1 indicate the relative concentrations of the species in the stream, wherein four stars (**) represents a high concentration, three stars (*) represents a high-intermediate concentration, two stars (**) represents a low-intermediate concentration, and one star (*) represents a low concentration. The thermal oxidizer effluent 101 includes a high concentration of $N_2$, a high-intermediate concentration of $H_2O$ and $CO_2$, a low-intermediate concentration of $O_2$, and a low concentration of CO and $SO_2$. In some implementations, the concentration of $SO_2$ in the thermal oxidizer effluent 101 is 0.05-1 mol %. In some implementations, the concentration of $O_2$ in the thermal oxidizer effluent 101 is 2-3 vol %.

The thermal oxidizer effluent 101 exits the thermal oxidizer 160 at a temperature of about 1100° F. (593° C.). In some implementations, the thermal oxidizer effluent is cooled to a temperature of about 330° F. (166° C.) using a waste heat recovery system 165 before entering the quench tower 102. The thermal oxidizer effluent 101 is routed to the bottom section 130 of a quench tower 102. The thermal oxidizer effluent is then contacted by the dilute aqueous acid quench stream 105. The thermal oxidizer effluent is further cooled by contact with the dilute aqueous acid quench stream 105.

The dilute aqueous acid quench stream 105 enters from the upper section 120 of the quench tower 102. The dilute aqueous acid quench stream 105 has a temperature between about 110° F. (43° C.) and about 140° F. (60° C.). In some implementations, the dilute aqueous acid quench stream 105 has a temperature of about 120° F. (49° C.).

In the quench tower, sulfur dioxide from the thermal oxidizer effluent 101 hydrates and reacts readily with the excess oxygen present in the thermal oxidizer effluent (E°=+1.1301 V), as shown in Equation 3:

$$2SO_2+O_2+2H_2O \rightarrow 2H^++2HSO_4^- \quad E°=1.1301 \text{ V} \qquad \text{Eq. 3}$$

The product of this reaction is sulfuric acid. The rate of the reaction is dependent on the concentration of hydrated sulfur dioxide and independent on the concentration of oxygen, whether the oxygen is dissolved or not. The rate of the oxidation reaction can be expressed as in Equation 4:

$$r=k[SO_2 \cdot H_2O]^{3/2} \qquad \text{Eq. 4}$$

The rate constant, k, with units of $L^{3/2} \cdot mol^{-1/2} \cdot s^{-1}$, can be expressed as in Equation 5:

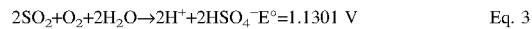

$$k = 1.95 \times 10^{13} e^{\left(\frac{-86000}{RT}\right)} \qquad \text{Eq. 5}$$

where R is the ideal gas constant and T is the temperature in Kelvin. The rate of the reaction shown in Equation 3 increases as the temperature of the reaction increases. However, the rate of the reaction is not altered by the presence of sulfuric acid. The reaction as shown in Equation 3 takes place in the packing zone of the quench tower 102. The packing zone is a section that offers a large surface to facilitate contact between the liquid phase, i.e., the acidic water, and the gas phase. This also facilitates the removal of $SO_2$ from the gas phase. A packing zone can vary in material (e.g. plastic, ceramic, metal), in morphology (e.g. rings, beads, saddles), and in organization (i.e. structured or random). The packing zone also induces mixing in each phase, to avoid any concentration polarization in the gas phase and/or the liquid phase. After hydration of the $SO_2$, oxidation of the $SO_2$ occurs in the water phase. Other species present in the thermal oxidizer effluent ($N_2$, unreacted $O_2$, uncondensed $H_2O$, and $CO_2$) exit the top of the quench tower as the quench tower effluent 104. The stars in FIG. 1 indicate the relative concentrations of these species, as discussed herein. The quench tower effluent 104 is sent to a flare stack, mitigating any $SO_2$ breakthrough that can occur during upset conditions. Upset conditions occur when $SO_2$ is not successful treated in the quench tower, for example, when a portion of the $SO_2$ remains in the gas phase due to poor contacting between the gas and liquid phases (e.g. channeling of the gas stream or lowering of liquid-to-gas ratio).

The cooling action of the dilute aqueous acid quench stream 105 also condenses water vapor in the thermal oxidizer effluent 101. The mixture of the produced sulfuric acid in the condensed water and the dilute aqueous acid quench stream yields a produced dilute aqueous acid stream 103. The mass concentration of sulfuric acid in the produced dilute aqueous acid stream 103 is between about 2 and about 20 wt %. The produced dilute aqueous acid stream 103 exits the lower section of the quench tower and is sent to a cooler 108 using a pump 106. In some implementations, the cooler 108 is a heat exchanger. In some implementations, the cooler 108 is an air cooler. The produced dilute aqueous acid stream 103 is cooled from about 160° F. (71° C.) to about 140° F. (60° C.) to yield a cooled dilute aqueous acid stream 109. The cooled dilute aqueous acid stream 109 exits the cooler 108 and is split into the dilute aqueous acid quench stream 105 and a dilute aqueous acid buffer stream 110. In some implementations, this split is performed by monitoring the flowrate of the cooled dilute aqueous acid stream 109 and by diverting a part of this flow using a controller and controlled valve (not shown). The split can be based on the desired concentration of sulfuric acid in the produced dilute aqueous acid stream 103, which in turn determines how much of the dilute aqueous acid quench stream 105 is required in quench tower 102. Most of the cooled dilute aqueous acid stream 109 (approximately 99.5-95 wt %) is sent back to the upper section 120 of the quench tower 102 as the dilute aqueous acid quench stream 105. The dilute aqueous acid buffer stream 110 includes the remaining small portion (approximately 0.5-5 wt %) of the cooled dilute aqueous acid stream 109. This small portion is approximately the same as the amount of water condensed in the quench tower 102, ensuring that the amount of water in the quench tower remains constant, and that the produced dilute aqueous acid stream 103 maintains a constant concentration of sulfuric acid.

The dilute aqueous acid buffer stream 110 is sent to a buffer tank 111. Any unreacted $SO_2$ will continue to react readily in the aqueous acid buffer stream with $O_2$ from the air. The buffer tank 111 includes a vent 112. If the concentration of the $SO_2$ and sulfuric acid in the dilute aqueous acid buffer stream is low, the buffer tank can be vented to the open air. The venting process can ensure that any liquid sent to a subsequent membrane process is free from gas and minimizes degassing in a subsequent membrane process. In addition, the vent can be used to equilibrate the pressure in the buffer tank when the second pump 114 is in operation. In some implementations, the vent 112 can be connected to the quench tower 102, and vented gases 140 can be routed to the upper section 120 of the quench tower 102. The vented gases 140 enter the quench tower 102 below the dilute aqueous acid quench stream 105. Venting the buffer tank 111 to the quench tower 102 recycles undissolved gases, for example, $CO_2$ or traces of $SO_2$, to the quench tower and increases the yield of sulfuric acid in the produced dilute aqueous acid stream 103. In some implementations, in order to avoid any $SO_2$ emission, the vent 112 is equipped with a small column where a clean water stream is circulated, or a water trap. In some implementations, a blanket of inert atmosphere is injected into the buffer tank via the vent 112.

In some implementations, the dilute aqueous acid buffer stream 110 in the buffer tank 111 exits the buffer tank and is routed to a water treatment unit 116 using a second pump 114. The water treatment unit 116 is configured to remove sulfurous and sulfuric acids from the dilute aqueous acid buffer stream 110. In some implementations, the water treatment unit 116 is a reverse osmosis membrane treatment unit, a nanofiltration unit, or a combination of nanofiltration and reverse osmosis membranes. The water treatment unit can concentrate sulfuric acid up to 70-90 wt %. The water treatment unit can yield a permeate 118 that is mainly water. The permeate 118 can have a concentration of sulfuric acid that ranges from 0-1 wt %, with a pH that ranges from about 7.0 to about 0.98 respectively. The permeate 118 can be reused in the facility or sent to an evaporation pond. The water treatment unit also yields a retentate stream 117 that is mainly concentrated sulfuric acid (approximately 70-90 wt %). The retentate 117 can be monetized or sent to a sulfur recovery unit (SRU) to enrich a Claus furnace in oxygen.

In some implementations, the water treatment unit 116 is an electrodialysis unit. The electrodialysis units can be used to concentrate the sulfuric acid up to 20-30 wt %.

In some implementations, dilute aqueous acid buffer stream 110 is concentrated by distillation in the water treatment unit 116, using part of the steam generated from the thermal oxidizer 160, or by utilizing the heat from a waste heat recovery system installed downstream of the reaction furnace of the Claus process. For example, steam can be generated by utilizing the hot thermal oxidizer effluent gas (temperature >1100° F. (593° C.)) to heat up boiler feed water in a waste heat recovery heat exchanger downstream of the thermal oxidizer. The steam can then be used to concentrate the dilute aqueous acid buffer stream by boiling off water with the steam.

Figure 2:
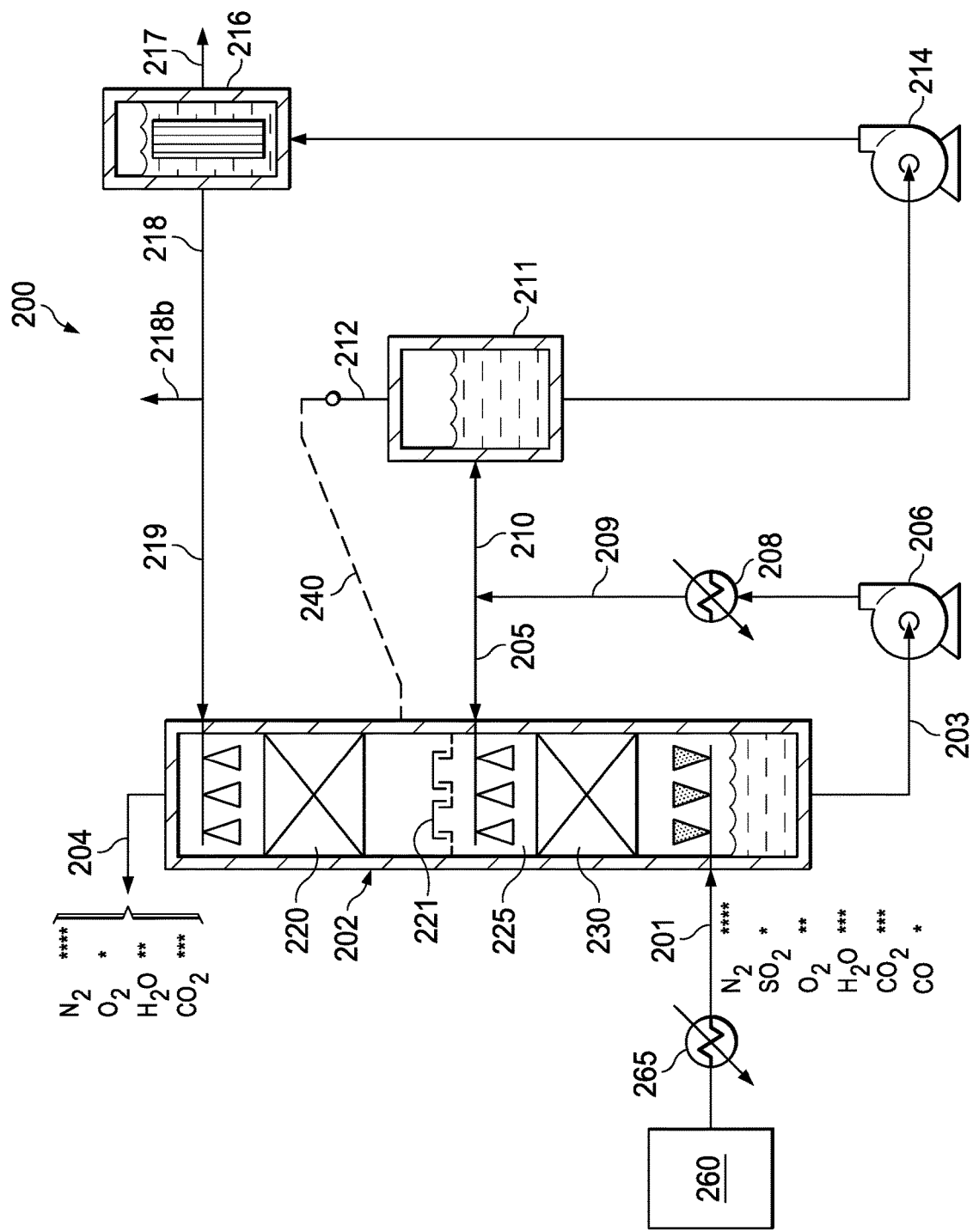
FIG. 2 is an example schematic of a system 200 for removing sulfur-containing compounds from a gas.

FIG. 2 is an example schematic of a system 200 for removing sulfur-containing compounds from a gas. A thermal oxidizer effluent 201 exits a thermal oxidizer 260. The thermal oxidizer effluent 201 is the product of the complete combustion of hydrogen sulfide and other sulfur-containing compounds in the thermal oxidizer. The thermal oxidizer effluent 201 contains Na, $SO_2$, $O_2$, $H_2O$, $CO_2$, and CO. The stars (*) shown in FIG. 2 indicate the relative concentrations of the species in the stream, as discussed herein. The thermal oxidizer effluent 201 includes a high concentration of $N_2$, a high-intermediate concentration of $H_2O$ and $CO_2$, a low-intermediate concentration of $O_2$, and a low concentration of CO and $SO_2$. In some implementations, the concentration of $SO_2$ in the thermal oxidizer effluent is 0.05-1 mol %. In some implementations, the concentration of $O_2$ in the thermal oxidizer gas is 2-3 vol %.

The thermal oxidizer effluent 201 exits the thermal oxidizer 260 at a temperature of about 1100° F. (593° C.). The thermal oxidizer effluent 201 is cooled using a waste heat recovery unit 265 before entering the bottom section 230 of the quench tower 202. The quench tower includes an upper section 220, a mid-section 225, and a lower section 230. The upper section 220 of the quench tower and the lower section 230 of the quench tower 202 are fluidly connected in the mid-section 225 by a perforated plate 221. The perforated plate 221 redistributes the water from a fresh water stream 219 on the packing of the lower section 230. The perforated plate is configured to redistribute the falling liquid on the top of the packing in the lower section 230, as well as to allow gas to pass through from the upper to the lower section. The perforated plate can be made of plastic, ceramic, or metal. In some implementations, the perforated plate can be a splash-plate or channel-type plate.

The dilute aqueous acid quench stream 205 is sprayed on the packing of the lower section 230. The packing zone in the lower section 230 can vary in material (e.g. plastic, ceramic, metal), in morphology (e.g. rings, beads, saddles), and in organization (i.e. structured or random). The packing zone offers a large surface to facilitate contact between the liquid phase, i.e., the acidic water, and the gas phase. This also facilitates the removal of $SO_2$ from the gas phase. The packing zone also induces mixing in each phase, to avoid any concentration polarization in the gas phase and/or the liquid phase.

The thermal oxidizer effluent 201 is further cooled in the quench tower by contact with the dilute aqueous acid quench stream 205 and the fresh water stream 219. The dilute aqueous acid quench stream 205 enters the quench tower 202 at the mid-section 225 of the quench tower 202. The dilute aqueous acid quench stream 205 has a temperature between about 110° F. (43° C.) and about 140° F. (60° C.). In some implementations, the diluted sulfuric acid stream 205 has a temperature of about 120° F. (49° C.). The fresh water stream 219 enters the upper section 220 of the quench tower 202. The fresh water stream 219 has a temperature between about 110° F. (43° C.) and about 140° F. (60° C.). In some implementations, the fresh water stream 219 has a temperature of about 120° F. (49° C.).

The oxidation of hydrated sulfur dioxide into sulfuric acid occurs in the packing zones of the quench tower, in the upper and lower sections 220 and 230. As described herein, sulfur dioxide in the thermal oxidizer effluent 201 hydrates in water and reacts readily with the excess oxygen present in the thermal oxidizer effluent, as shown in Equation 3. The product of this reaction is sulfuric acid. The rate of this reaction is dependent on the concentration of hydrated sulfur dioxide. The cooling action of the dilute aqueous acid quench stream 205 and the fresh water stream 219 condenses water vapor contained in the thermal oxidizer effluent 201. $SO_2$ from the thermal oxidizer effluent dissolves and hydrates in water, and, in the aqueous phase, reacts with the excess of oxygen present in the thermal oxidizer effluent to yield to a mixture of sulfurous acid ($H_2SO_3$) and sulfuric acid ($H_2SO_4$). The generated sulfurous and sulfuric acids in the chilled acidic water yields a produced sulfuric acid stream. The resulting produced sulfuric acid stream maintains a mass concentration of sulfuric acid between 2 and 20 wt % at the bottom of the quench tower. Other species present in the thermal oxidizer effluent ($N_2$, unreacted $O_2$, uncondensed $H_2O$, and $CO_2$) exit the top of the quench tower as the quench tower effluent 204. The stars in FIG. 2 indicate the relative concentrations of these species, as discussed herein. The quench tower effluent 204 is sent to a flare stack, mitigating any $SO_2$ breakthrough that can occur during upset conditions.

The produced dilute aqueous acid stream 203 exits the lower section of the quench tower 202 and is routed to a cooler 208 using a pump 206. In some implementations, the cooler 208 is a heat exchanger. In some implementations, the cooler 208 is an air cooler. The produced dilute aqueous acid stream 203 is cooled by the cooler from about 160° F. (71° C.) to about 120° F. (49° C.) to yield a cooled dilute aqueous acid stream 209. The cooled dilute aqueous acid stream 209 is split into the dilute aqueous acid quench stream 205 and a dilute aqueous acid buffer stream 210. In some implementations, this split is performed by monitoring the flowrate of the cooled dilute aqueous acid stream 209 and by diverting a part of this flow using a controller and controlled valve (not shown). The split can be based on the desired concentration of sulfuric acid in the produced dilute aqueous acid stream 203, which in turn determines how much of the dilute aqueous acid quench stream 205 is required in the quench tower 202. In some implementations, the cooled dilute aqueous acid stream 209 is split evenly, i.e., the dilute aqueous acid quench stream 205 and the dilute aqueous acid buffer stream 210 each contain 50 wt % of the cooled dilute aqueous acid stream. The dilute aqueous acid quench stream 205 is routed back to the mid-section 225 of the quench tower 202. The dilute aqueous acid buffer stream 210 is sent to a buffer tank 211. Any unreacted $SO_2$ will continue to react readily in the aqueous acid buffer stream with $O_2$ from the air. The buffer tank 211 is fitted with a vent 212. If the concentration of the $SO_2$ and sulfuric acid in the dilute aqueous acid buffer stream 210 is low, the buffer tank can be vented to the open air. The venting process can ensure that any liquid sent to a subsequent membrane process is free from gas and minimizes degassing in a subsequent membrane process. In addition, the vent can be used to equilibrate the pressure in the buffer tank when the second pump 214 is in operation. In some implementations, the vent 212 can be connected to the quench tower 202, and vented gases 240 can be routed to the mid-section of the quench tower 202. The vented gases 240 enter the quench tower 202 below the dilute aqueous acid quench stream 205. Venting the buffer tank 211 to the quench tower 202 recycles undissolved gases, for example, $SO_2$ and $CO_2$, to the quench tower and increases the yield of sulfuric acid in the produced dilute aqueous acid stream 203.

In some implementations, in order to avoid any $SO_2$ emission, the vent 212 is equipped with a small column where a clean water stream is circulated, or a water trap. In some implementations, a blanket of inert atmosphere is injected into the buffer tank via the vent 212.

The dilute aqueous acid buffer stream 210 can be routed from the buffer tank 211 to a water treatment unit 216 using a second pump 214. The water treatment unit 216 is configured to remove sulfurous and sulfuric acid from the dilute aqueous acid buffer stream 210. In some implementations, the water treatment unit 216 is a reverse osmosis membrane treatment unit, a nanofiltration unit, or a combination of nanofiltration and reverse osmosis membranes. The water treatment unit can concentrate the sulfuric acid in the dilute aqueous acid buffer stream 210 up to 70-90 wt %. The permeate 218 of the water treatment unit is mainly water. The permeate 218 can have a concentration of sulfuric acid that ranges from 0-1 wt %, with a pH that ranges from about 7.0 to about 0.98 respectively. Most of the permeate (about 90-99 wt %) is sent to the upper portion 220 of the quench tower 202 as the fresh water stream 219. A small portion 218b (about 1-10 wt %) of the permeate 218 is removed. This portion 218b corresponds to roughly the amount of water condensed in the quench tower 202, ensuring that the amount of water in the quench tower remains constant, and the produced dilute aqueous acid stream 203 maintains a constant concentration of sulfuric acid. This portion 218b can be reused in the facility or send to an evaporation pond.

The retentate 217 of the reverse osmosis treatment unit is concentrated sulfuric acid (70-90 wt %). The retentate can be monetized or sent to a sulfur recovery unit (SRU) to enrich a Claus furnace in oxygen.

In some implementations, the water treatment unit 216 is an electrodialysis unit. The electrodialysis unit can be used to concentrate the sulfuric acid up to 20-30 wt %.

In some implementations, dilute aqueous acid buffer stream 210 is concentrated by distillation in the water treatment unit 216, using part of the steam generated from the thermal oxidizer, or by utilizing the heat from a waste heat recovery system installed downstream of the reaction furnace of the Claus process.

Figure 3:
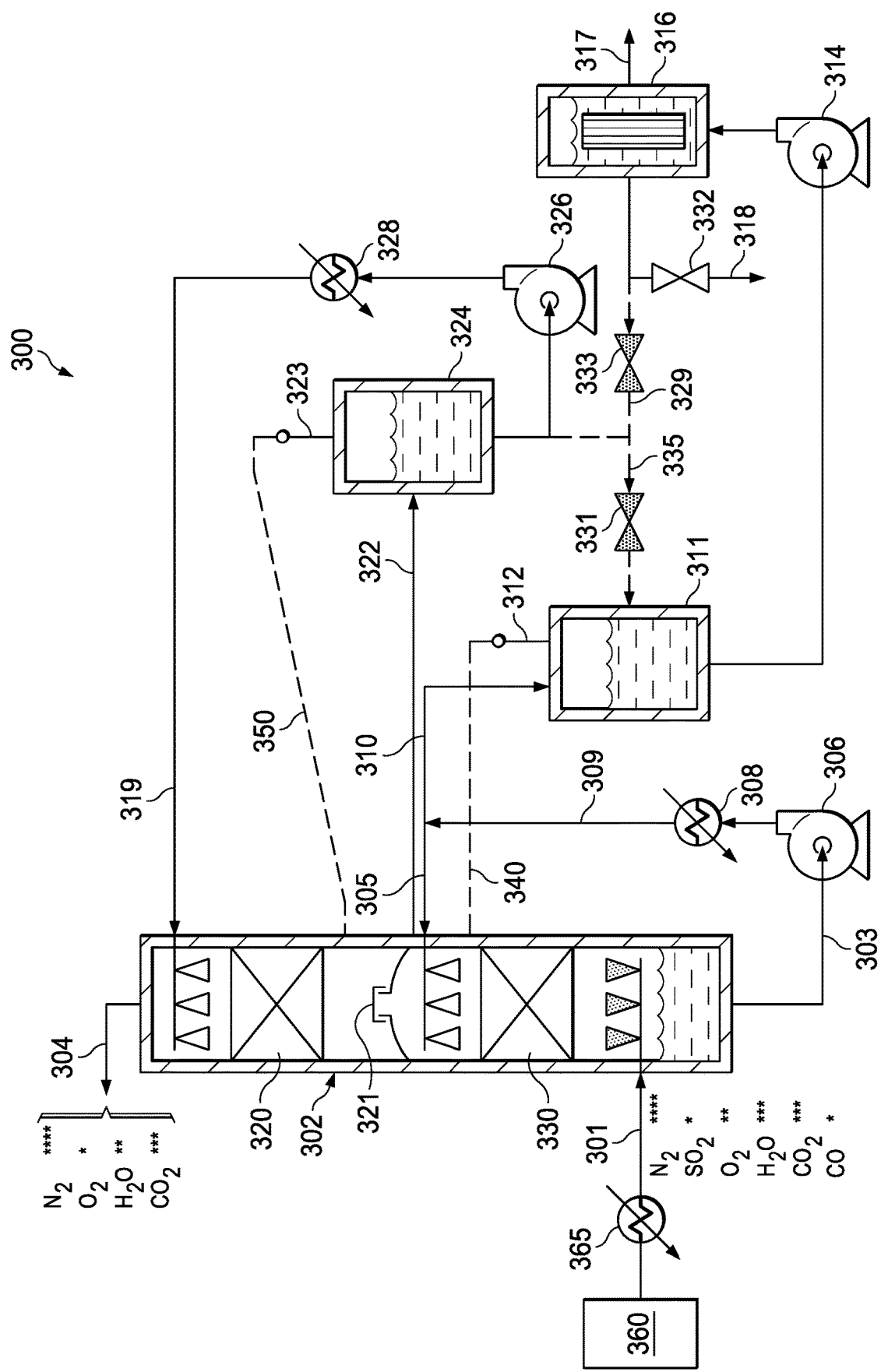
FIG. 3 is an example schematic of a system 300 for removing sulfur-containing compounds from a gas.

FIG. 3 is an example schematic of a system 300 for removing sulfur-containing compounds from a gas. A thermal oxidizer effluent 301 is sent to the bottom section 330 of a quench tower 302. The thermal oxidizer effluent 301 is the result of the complete combustion of hydrogen sulfide and other sulfur-containing compounds in a thermal oxidizer 360. The thermal oxidizer effluent 301 contains $N_2$, $SO_2$, $O_2$, $H_2O$, $CO_2$, and CO. The stars (*) shown in FIG. 3 indicate the relative concentrations of the species in the stream, as discussed herein. The thermal oxidizer effluent 301 includes a high concentration of $N_2$, a high-intermediate concentration of $H_2O$ and $CO_2$, a low-intermediate concentration of $O_2$, and a low concentration of CO and $SO_2$. In some implementations, the concentration of $SO_2$ in the thermal oxidizer effluent 301 is 0.05-1 mol %. In some implementations, the concentration of $O_2$ in the thermal oxidizer effluent is 2-3 vol %.

The thermal oxidizer effluent 301 exits the thermal oxidizer 360 at a temperature of about 1100° F. (593° C.). The thermal oxidizer effluent is cooled to about 330° F. (166° C.) using a waste heat recovery unit 365 before being routed to the quench tower 302. In the quench tower 302, the thermal oxidizer effluent is further cooled by contact with a dilute aqueous acid quench stream 305 and a fresh water stream 319. The dilute aqueous acid quench stream 305 enters the quench tower 302 at the mid-section 325 of the quench tower 302. The dilute aqueous acid quench stream enters the quench tower at a temperature of about 140° F. (60° C.). The fresh water stream 319 enters the quench tower 302 at the upper section 320 of the quench tower. The fresh water stream 319 enters the quench tower at a temperature of about 140° F. (60° C.).

The upper section 320 of the quench tower 302 are fluidly connected to the lower section 330 of the quench tower 302 by a plate 321 in the mid-section 325 of the tower. The plate 321 includes bubble caps. The bubble caps allow gas upwards through the plate. The plate 321 also collects fresh water from the fresh water stream 319. The fresh water can be recovered from the plate 321.

The oxidization of hydrated sulfur dioxide into sulfuric acid, as described in Eq. 3, occurs mainly in the packing zone of the lower section 330 of the quench tower 302. Other species present in the thermal oxidizer effluent ($N_2$, unreacted $O_2$, uncondensed $H_2O$, and $CO_2$) exit the top of the quench tower as the quench tower effluent 304. The stars in FIG. 3 indicate the relative concentration of these species, as discussed herein. The quench tower effluent 304 is sent to a flare stack, mitigating any $SO_2$ breakthrough that can occur during upset conditions.

The produced dilute aqueous acid stream 303 exits the lower section of the quench tower and is sent to a cooler 308 using a pump 306. In some implementations, the cooler 308 is a heat exchanger. In some implementations, the cooler 308 is an air cooler. The produced dilute aqueous acid stream 303 enters the cooler and is further cooled from about 160° F. (71° C.) to about 140° F. (60° C.) to yield a cooled dilute aqueous acid stream 309. The cooled dilute aqueous acid stream 309 is split into the dilute aqueous acid quench stream 305 and a dilute aqueous acid buffer stream 310. In some implementations, this split is performed by monitoring the flowrate of the cooled dilute aqueous acid stream 309 and by diverting a part of this flow using a controller and controlled valve (not shown). The split can be based on the desired concentration of sulfuric acid in the produced dilute aqueous acid stream 303, which in turn determines how much of the dilute aqueous acid quench stream 305 is required in the quench tower 302. About 99.5 to 95 wt % of the cooled acidic aqueous stream 309 is sent back to the mid-section of the quench tower as the dilute aqueous acid quench stream 305. A small portion (about 0.5 to 5 wt %) of the cooled acidic aqueous stream 309 is sent to a buffer tank 311 as the dilute aqueous acid buffer stream 310. This small portion corresponds roughly to the amount of water condensed in the quench tower 302, ensuring that the amount of water in the quench tower remains constant, and that the produced dilute aqueous acid stream 303 maintains a constant concentration of sulfuric acid. Any unreacted $SO_2$ will continue to react readily in the aqueous acid buffer stream with $O_2$ from the air.

The buffer tank 311 is fitted with a vent 312. If the concentration of $SO_2$ and sulfuric acid in the dilute aqueous acid buffer stream is low, the buffer tank can be vented to the open air. The venting process can ensure that any liquid sent to a subsequent membrane process is free from gas and minimizes degassing in a subsequent membrane process. In addition, the vent can be used to equilibrate the pressure in the buffer tank when the second pump 314 is in operation.

In some implementations, the vent 312 can be configured to route vented gases 340 to the lower section 330 of the quench tower. The vented gases 340 enter the quench tower below the dilute aqueous acid quench stream 305. Venting the buffer tank 311 to the quench tower 302 recycles undissolved gases, for example, $SO_2$ and $CO_2$, to the quench tower and increases the yield of sulfuric acid in the produced dilute aqueous acid stream 303. In some implementations, in order to avoid any $SO_2$ emission, the vent 312 is equipped with a small column where a clean water stream is circulated, or a water trap. In some implementations, a blanket of inert atmosphere is injected via the vent 312.

The dilute aqueous acid buffer stream 310 exits the buffer tank 311 and is routed to a water treatment unit 316 using a second pump 314. The water treatment unit 316 is configured to remove sulfurous and sulfuric acid from the dilute aqueous acid buffer stream 310. In some implementations, the water treatment unit 316 is a reverse osmosis membrane treatment unit, a nanofiltration unit, or a combination of nanofiltration and reverse osmosis membranes. The water treatment unit can concentrate sulfuric acid up to about 70-90 wt %. The permeate 318 of the water treatment unit is mainly water. The permeate 318 can have a concentration of sulfuric acid that ranges from 0-1 wt %, with a pH that ranges from about 7.0 to about 0.98 respectively. The permeate 318 can be reused in the facility or sent to an evaporation pond via valve 332. The retentate 317 of the water treatment unit is mainly concentrated sulfuric acid, about 70-90 wt %. The retentate 317 can be monetized or sent to a sulfur recovery unit (SRU) to enrich a Claus furnace in oxygen.

In some implementations, the water treatment unit 316 is an electrodialysis unit. The electrodialysis units can be used to concentrate the sulfuric acid up to 20-30 wt %.

In some implementations, the dilute aqueous acid buffer stream 310 is concentrated by distillation in the water treatment unit 316, using part of the steam generated from the thermal oxidizer, or by utilizing heat from a waste heat recovery system installed downstream of the reaction furnace of the Claus process.

As discussed herein, the plate 321 is configured to collect and recover water from the fresh water stream 319. In some implementations, the recovered fresh water 322 is sent to a second buffer tank 324. The second buffer tank 324 is fitted with a second vent 323. If the concentration of $SO_2$ and sulfuric acid in the recovered fresh water 322 is low, the second buffer tank 324 can be vented to the open air. The venting process can ensure that any liquid sent to a subsequent membrane process is free from gas and minimizes degassing in a subsequent membrane process. In addition, the vent can be used to equilibrate the pressure in the buffer tank when the third pump 326 is in operation. In some implementations, the second vent 323 can be connected to the upper section 320 of the quench tower 302. The vented gases 350 enter the quench tower 302 below the fresh water stream 319. Venting the second buffer tank 324 to the quench tower 302 recycles undissolved gases, for example, $SO_2$ and $CO_2$, to the quench tower and increases the yield of sulfuric acid in the produced dilute aqueous acid stream 303.

In some implementations, the second vent 323 is equipped with a small column where a clean water stream is circulated, or a water trap, to prevent $SO_2$ from being released to the atmosphere. In some implementations, a blanket of inert atmosphere is injected into the second buffer tank via the second vent 323.

In some implementations, the fresh water stream 319 exits the second buffer tank and is maintained at a temperature of about 140° F. (60° C.) by a heat exchanger 328 before being directed to the top of the quench tower.

As described herein, the oxidation of hydrated sulfur dioxide into sulfuric acid occurs mainly in the packing zone of the lower section 330 of the quench tower 302. However, if there is a variation or upset in the composition or flowrate of the thermal oxidizer effluent 301, or if a production upset generates a large amount of $SO_2$ that cannot be handled by the lower section of the quench tower, breakthrough can occur and $SO_2$ gas enters the upper section 320 of the quench tower 302. The breakthrough $SO_2$ is absorbed by fresh water coming from fresh water stream 319 to yield sulfurous and sulfuric acid in the upper section 320 of the quench tower 302. The fresh water stream 319 cools and dissolves the sulfurous and the sulfuric acid. The sulfurous and sulfuric acid generated by the breakthrough of the $SO_2$ is recovered in the fresh water stream 322.

Therefore, when breakthrough of sulfur dioxide occurs, the pH of the recovered fresh water 322 decreases. Without breakthrough, the pH of the fresh water 322 is between 7 and 1 (respectively 0-1 wt % of sulfuric acid). When breakthrough occurs and the pH reaches about 0.5, as measured by an in-line or bypass pH probe, the recovered water stream 322 that exits the second buffer tank 324 is diverted to the buffer tank 311 via line 335 and valve 331. In some implementations, the valves can be controlled manually. In some implementations, the valves can be controlled with a controller linked to pH meters and liquid level meters in the buffer tank 311 and the second buffer tank 324. The recovered water stream is therefore held in the buffer tank 311 and subsequently treated using the water treatment unit 316. The permeate 318 of the water treatment unit is then sent back to the upper section 320 of the quench tower 302 via line 329 and valve 333 and the third pump 326. Accordingly, the system 300 mitigates the breakthrough by treating the recovered water 322 to remove sulfuric acid.

In some implementations, system 300 includes an alternative arrangement of lines and valves. For example, the recovered water stream 322 that exits the second buffer tank 324 can pass through line 335 and valve 331 to pump 314. In this implementation, line 335 is connected to the bottom of the second buffer tank 324. In this implementation, fresh water from the water treatment unit 316 is routed into tank 324 through valve 333 and line 329, where line 329 is connected to the top of the second buffer tank 324. In this implementation, the valves can be controlled manually, or the valves can be controlled with a controller linked to pH meters and liquid level meters in the buffer tank 311 and the second buffer tank 324.

Figure 4:
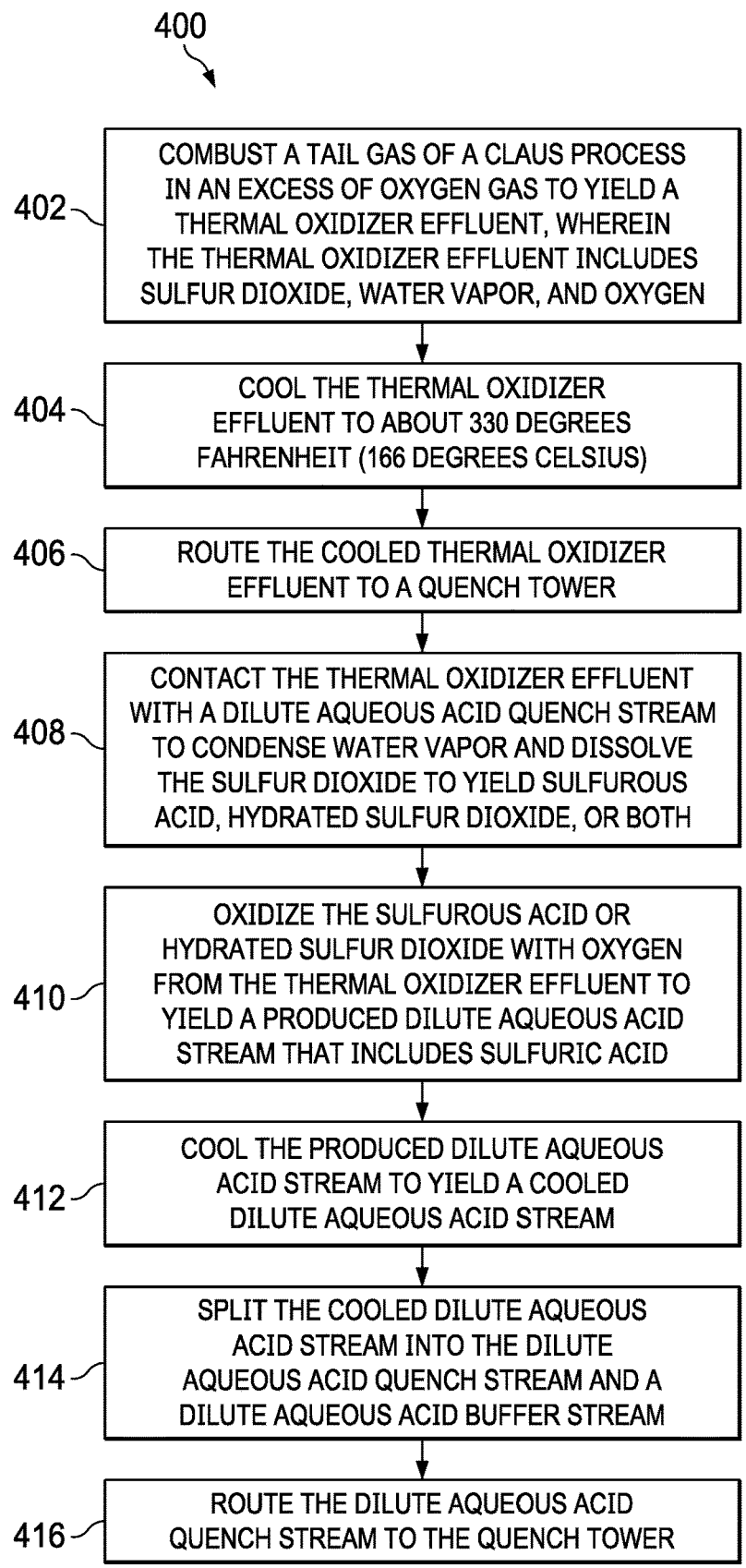
FIG. 4 is a flowchart of an example method 400 of treating a tail gas of a Claus process to remove sulfur-containing compounds.

FIG. 4 shows an example method 400 of treating a tail gas of a Claus process to remove sulfur-containing compounds. At 402, the tail gas of a Claus process is combusted in a thermal oxidizer in an excess of oxygen gas to yield a thermal oxidizer effluent that contains sulfur dioxide, water vapor, and oxygen. At 404, the thermal oxidizer effluent is cooled to about 330° F. (166° C.). At 406, the cooled effluent is routed to a quench tower.

At 408, the thermal oxidizer effluent entering the quench tower is contacted with a dilute aqueous acid quench stream to condense water vapor and dissolve the sulfur dioxide to yield sulfurous acid, hydrated sulfur dioxide, or both. At 410, the sulfurous acid or hydrated sulfur dioxide is oxidized with oxygen from the thermal oxidizer effluent to yield a produced dilute aqueous acid stream that includes sulfuric acid. In some implementations, the produced dilute aqueous acid stream contains between about 2 and about 20 wt % sulfuric acid.

At 412, the produced dilute aqueous acid stream is cooled to about 140° F. (60° C.) to yield a cooled dilute aqueous acid stream. At 414, the cooled dilute aqueous acid stream is split to yield the dilute aqueous acid quench stream and a dilute aqueous acid buffer stream. In some implementations, the dilute aqueous acid buffer stream is approximately the same volume as the water condensed from the thermal oxidizer effluent. In some implementations, the cooled dilute aqueous acid stream is evenly split, such that the dilute aqueous acid quench stream and the dilute aqueous acid buffer stream each comprise approximately 50% of the cooled dilute aqueous acid stream.

At 416, the dilute aqueous acid quench stream is routed to the quench tower. In some implementations, the dilute aqueous acid buffer stream is routed to a water treatment unit. In some implementations, the water treatment unit is a reverse osmosis membrane treatment unit, a nanofiltration unit, or a combination of nanofiltration and reverse osmosis membranes. The water treatment unit can concentrate sulfuric acid up to 70-90 wt %. The water treatment unit can yield a permeate that is mainly water. The permeate can have a concentration of sulfuric acid that ranges from 0-1 wt %, with a pH that ranges from about 7.0 to about 0.98 respectively. The permeate can be reused in the facility or sent to an evaporation pond. The water treatment unit also yields a retentate stream that is mainly concentrated sulfuric acid (approximately 70-90 wt %). The retentate can be monetized or sent to a sulfur recovery unit (SRU) to enrich a Claus furnace in oxygen.

In some implementations, the water treatment unit is an electrodialysis unit. The electrodialysis units can be used to concentrate the sulfuric acid up to 20-30 wt %.

In some implementations, dilute aqueous acid buffer stream is concentrated by distillation in the water treatment unit, using part of the steam generated from the thermal oxidizer, or by utilizing the heat from a waste heat recovery system installed downstream of the reaction furnace of the Claus process. For example, steam can be generated by utilizing the hot thermal oxidizer effluent gas (temperature >1100° F. (593° C.)) to heat up boiler feed water in a waste heat recovery heat exchanger downstream of the thermal oxidizer. The steam can then be used to concentrate the dilute aqueous acid buffer stream by boiling off water with the steam. The water treatment unit yields a permeate that is substantially water and a retentate that is concentrated sulfuric acid.

In some implementations, the method includes contacting the sulfuric acid with a fresh water stream. The fresh water stream is recovered. In some implementations, the recovered water is reused as the fresh water stream. If the pH of the recovered water drops below 0.5, the recovered water can be routed to the water treatment unit. The permeate of the water treatment unit can be routed to the quench tower or to an evaporation pond. The retentate of the water treatment unit can be monetized or sent to an SRU to enrich a Claus furnace in oxygen.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

As used in this disclosure, "volume percent" (vol %) can be considered a volume fraction or a volume ratio of a substance to the total volume of the mixture or composition.

As used in this disclosure, "mole percent" (mol %) can be considered a mole fraction or mole ratio of a substance to the total number of moles of the mixture or composition.

A number of implementations of the disclosure have been described. Nevertheless, it will be understood that various modifications may be made without departing from the spirit and scope of the disclosure.

What is claimed is:

1. A method for treating a tail gas of a Claus process to remove sulfur-containing compounds, the method comprising:
   combusting a tail gas of a Claus process in an excess of oxygen gas, wherein the excess of oxygen gas comprises a number of moles of oxygen exceeding the number of moles of oxygen required to fully combust the sulfur-containing compounds, to yield a thermal oxidizer effluent, wherein the thermal oxidizer effluent comprises sulfur dioxide, water vapor, and oxygen;
   cooling the thermal oxidizer effluent to yield a cooled thermal oxidizer effluent;
   flowing the cooled thermal oxidizer effluent to a quench tower;
   contacting the cooled thermal oxidizer effluent in the quench tower with a dilute aqueous acid quench stream to condense water vapor and dissolve the sulfur dioxide to yield sulfurous acid, hydrated sulfur dioxide, or a combination of sulfurous acid and hydrated sulfur dioxide;
   oxidizing the sulfurous acid or hydrated sulfur dioxide with oxygen from the thermal oxidizer effluent to yield a produced dilute aqueous acid stream that comprises sulfuric acid;
   cooling the produced dilute aqueous acid stream to yield a cooled dilute aqueous acid stream;
   splitting the cooled dilute aqueous acid stream into the dilute aqueous acid quench stream and a dilute aqueous acid buffer stream; and
   flowing the dilute aqueous acid quench stream to the quench tower.

2. The method of claim 1, further comprising flowing the dilute aqueous acid buffer stream to a water treatment unit, wherein the water treatment unit yields a permeate that is substantially water and a retentate that is concentrated sulfuric acid.

3. The method of claim 2, further comprising:
   contacting the sulfur dioxide with a fresh water stream;
   oxidizing sulfurous acid, hydrated sulfur dioxide, or both into sulfuric acid with the excess of oxygen in the thermal oxidizer effluent;
   recovering a portion of the fresh water stream;
   monitoring the pH of the recovered water; and
   in response to a pH of the recovered water that is less than 0.5, flowing the recovered water to the water treatment unit.

4. The method of claim 3, further comprising flowing the permeate of the water treatment unit to the quench tower as the fresh water stream.

5. The method of claim 2, wherein the retentate of the water treatment unit is flowed to a sulfur recovery unit to enrich a Claus furnace in oxygen.

6. The method of claim 1, wherein contacting the cooled thermal oxidizer effluent in the quench tower with a dilute aqueous acid quench stream to condense water vapor and dissolve the sulfur dioxide to yield a produced dilute aqueous acid stream that comprises sulfurous acid, hydrated sulfur dioxide, or a combination of sulfurous acid and hydrated sulfur dioxide yields a produced dilute aqueous acid stream that comprises between about 2 and about 20 wt % sulfuric acid.

7. The method of claim 1, wherein splitting the cooled dilute aqueous acid stream into the dilute aqueous acid quench stream and the dilute aqueous acid buffer stream comprises splitting the cooled dilute aqueous acid stream into the dilute aqueous acid quench stream and a dilute aqueous acid buffer stream, wherein the dilute aqueous acid buffer stream comprises approximately the same volume as the water condensed from the thermal oxidizer effluent.

8. The method of claim 1, wherein splitting the cooled dilute aqueous acid stream into the dilute aqueous acid quench stream and a dilute aqueous acid buffer stream comprises splitting the cooled dilute aqueous acid stream evenly, wherein the dilute aqueous acid quench stream and the dilute aqueous acid buffer stream each comprise approximately 50% of the cooled dilute aqueous acid stream.

9. A system for removing sulfur-containing compounds from a gas, the system comprising:
   a thermal oxidizer configured to receive a gas comprising sulfur-containing compounds and to combust the sulfur-containing compounds in an excess of oxygen gas, wherein the excess of oxygen gas comprises a number of moles of oxygen exceeding the number of moles of oxygen required to fully combust the sulfur-containing compounds, to yield a thermal oxidizer effluent that contains sulfur dioxide;
   a waste heat recovery system coupled to the thermal oxidizer and configured to cool the thermal oxidizer effluent to yield a cooled thermal oxidizer effluent;
   a quench tower coupled to the waste heat recovery system and configured to
      receive the cooled thermal oxidizer effluent, and
      contact the cooled thermal oxidizer effluent with a dilute aqueous acid quench stream to
         dissolve the sulfur dioxide to sulfurous acid, hydrated sulfur dioxide, or a combination of sulfurous acid and hydrated sulfur dioxide,
         oxidize the sulfurous acid, hydrated sulfur dioxide, or both to sulfuric acid, and
         yield a produced dilute aqueous acid stream comprising sulfuric acid; and
   a cooler system coupled to the quench tower, wherein the quench tower is configured to flow the produced dilute aqueous acid stream to the cooler system, and wherein the cooler system is configured to:

receive the produced dilute aqueous acid stream,
cool the produced dilute aqueous acid stream to yield a cooled dilute aqueous acid stream,
split the cooled dilute aqueous acid stream into the dilute aqueous acid quench stream and a dilute aqueous acid buffer stream; and
flow the dilute aqueous acid quench stream to the quench tower.

10. The system of claim 9, further comprising a water treatment unit, wherein the water treatment unit is coupled to the cooler system and configured to receive the dilute aqueous acid buffer stream from the cooler system, and wherein the water treatment unit is configured to yield a permeate stream that is substantially water and a retentate stream that is concentrated sulfuric acid.

11. The system of claim 10, further comprising a buffer tank coupled between the cooler system and the water treatment unit, wherein the buffer tank is configured to receive the dilute aqueous acid buffer stream and to flow the dilute aqueous acid buffer stream to the water treatment unit.

12. The system of claim 11, wherein the buffer tank further comprises a vent, wherein the vent is coupled to the quench tower and configured to flow undissolved gases to the quench tower.

13. The system of claim 11, wherein the quench tower comprises:
an upper section;
a mid-section; and
a lower section, wherein the upper section and the lower section are connected in the mid-section by a plate, wherein the plate comprises bubble caps, wherein the plate is configured to collect liquid and allow gas to pass through the plate.

14. The system of claim 13, further comprising:
a second buffer tank coupled between the quench tower and a second cooler, wherein the second buffer tank is configured to receive recovered water from the quench tower, and wherein the second buffer tank comprises a second vent, and the second vent is coupled to the quench tower and configured to flow undissolved gases to the quench tower;
a fresh water stream, wherein the fresh water stream enters the quench tower at the upper section of the quench tower, and wherein the plate is configured to recover fresh water and flow the recovered water to the second buffer tank;
a second cooler, wherein the second cooler is configured to cool the recovered water from the second buffer tank and flow the cooled recovered water to the quench tower as the fresh water stream; and
a pH monitor configured to monitor the pH of the recovered water, wherein the second buffer tank is configured to flow the recovered water to the buffer tank via a valve when the pH of the recovered water is below 0.5, and wherein the water treatment unit is configured to flow the permeate stream to the quench tower as the fresh water stream.

15. The system of claim 10, wherein the water treatment unit is a reverse osmosis membrane treatment unit, and wherein the reverse osmosis membrane treatment unit yields a permeate that is substantially water and a retentate that is about 70 to about 90 wt % sulfuric acid.

16. The system of claim 15, wherein the retentate is flowed to a sulfur recovery unit to enrich a Claus furnace in oxygen.

17. The system of claim 9, wherein the waste heat recovery system is configured to cool the thermal oxidizer effluent to a temperature of about 330° F. (166° C.).

18. The system of claim 9, wherein the dilute aqueous acid quench stream has a temperature between about 110° F. (43° C.) and about 130° F. (54° C.).

19. The system of claim 9, wherein the produced dilute aqueous acid stream comprises between about 2 and about 20 wt % of sulfuric acid.

20. The system of claim 9, wherein the quench tower comprises:
an upper section;
a mid-section; and
a lower section, wherein the upper section and the lower section are connected in the mid-section by a perforated plate, wherein the perforated plate redistributes the dilute aqueous acid quench stream on the lower section of the quench tower.

* * * * *